United States Patent
Rutledge et al.

(10) Patent No.: US 7,155,126 B2
(45) Date of Patent: Dec. 26, 2006

(54) METHOD AND APPARATUS FOR DYNAMIC BANDWIDTH CONTROL IN A BROADCAST OPTICAL COMMUNICATIONS NETWORK

(75) Inventors: Christopher Rutledge, Somerset, NJ (US); Arul Arasan, North Brunswick, NJ (US)

(73) Assignee: Uhuru Networks, Somerset, NJ (US)

( * ) Notice: Subject to any disclaimer, the term of this patent is extended or adjusted under 35 U.S.C. 154(b) by 745 days.

(21) Appl. No.: 10/084,997

(22) Filed: Mar. 1, 2002

(65) Prior Publication Data

US 2004/0208549 A1    Oct. 21, 2004

(51) Int. Cl.
*H04J 14/00* (2006.01)
(52) U.S. Cl. .............. 398/50; 398/56; 398/57; 398/49; 398/48; 398/45
(58) Field of Classification Search ............. 398/1–214
See application file for complete search history.

(56) References Cited

U.S. PATENT DOCUMENTS

| | | | | |
|---|---|---|---|---|
| 4,801,190 A | * | 1/1989 | Imoto | ........................... 385/24 |
| 5,541,757 A | * | 7/1996 | Fuse et al. | ..................... 398/72 |
| 5,682,256 A | * | 10/1997 | Motley et al. | ............... 398/115 |
| 5,896,212 A | * | 4/1999 | Sotom et al. | .................. 398/55 |
| 6,512,612 B1 | * | 1/2003 | Fatehi et al. | ................... 398/49 |
| 6,529,301 B1 | * | 3/2003 | Wang | ........................... 398/82 |
| 6,895,185 B1 | * | 5/2005 | Chung et al. | .................. 398/72 |
| 2002/0018263 A1 | * | 2/2002 | Ge et al. | ..................... 359/128 |
| 2002/0057861 A1 | * | 5/2002 | Ge et al. | ...................... 385/16 |

* cited by examiner

*Primary Examiner*—M. R. Sedighian
(74) *Attorney, Agent, or Firm*—Birch, Stewart, Kolasch & Birch, LLP

(57) ABSTRACT

A method and apparatus provide a network element and associated control system in a broadcast optical communications network, including an optical switch (switch fabric), to cross-connect selected wavelengths input to the switch to pre-determined output ports, under the control of a control (supervisory) channel for efficient upstream and downstream delivery of optical communications services. The network element includes an optical switch controller to monitor the communications traffic input to and output from the optical switch ports in order to dynamically change output port connections for the input wavelengths as controlled by the control channel.

33 Claims, 16 Drawing Sheets

METHOD AND APPARATUS FOR DYNAMIC BANDWIDTH CONTROL IN A BROADCAST OPTICAL COMMUNICATIONS NETWORK

TECHNICAL FIELD

The present invention relates generally to optical communications networks and services. It particularly relates to a method and apparatus for providing dynamic bandwidth management and alternate network connectivity for a broadcast optical communications network.

BACKGROUND OF THE INVENTION

Broadcast optical communications networks (e.g., Cable TV networks) commonly use a passive optical network (PON) configuration (scheme) to deliver communications services to users using all or mostly passive components (e.g., splitters, etc.). As shown in FIG. 1, the PON commonly uses a combination of fiber nodes (FN), hybrid fiber-coax paths, and cascaded fiber splitting arranged in a tree-branch network to deliver all broadcast channels (wavelengths) to all subscribers to optical communications services.

In FIG. 1, the PON 100 features an optical fiber communications path 105 coming from a headend (HE) 102 and interconnecting with a fiber node 110 as may be common in broadcast optical communications networks such as a cable TV communications network. Upon output from the FN 110, the incoming optical path 105 may be converted into a hybrid fiber-coax (HFC) communications path 115 for delivering communications services to users. The PON 100 uses a tree-branch configuration as incoming communications path 105, FN 110, and output HFC path 115 form the trunk of a tree, and communications links (taps) 120, 122 form branch connections to deliver communications services to users 125, 128. One or more fiber nodes, such as FN 132, may connect to HFC path 115 via branch link 130, to split the communications path 115 into a plurality of communication paths 135, 136, 137 for delivery of services to users. Furthermore, fiber node 138 may be placed in cascaded connection with FN 132 to further split communications path 135 into a plurality of different communications paths 139, 140, 141 for better delivery of communications services to users.

By definition, a broadcast optical communications network delivers all channels (e.g., RF—radio frequency wavelengths) to all users (subscribers) all the time regardless of particular user selections (choices). For example, cable television (TV) typically may broadcast approximately 70 RF channels (e.g., channels B, C, D, etc.) that are carried by a single optical communications signal (e.g., 1530 nm optical wavelength) to all users (subscribers). Thus, for an exemplary scenario, a group of cable TV users that never watch channel D may continue to receive channel D due to the broadcast nature of the cable TV network. Therefore, channel (wavelength) D is a total waste of downstream bandwidth for this group of users. In another scenario, a cable TV service provider (who is limited by a finite bandwidth) may have to choose between offering channel A or channel B (as a new service) to the entire subscriber base when perhaps no more than 50% of the subscriber base watches that channel. Again, channel A or B will be a complete waste of bandwidth for perhaps 50% of the subscriber base.

Therefore, due to the disadvantages of current broadcast optical communications network, there is a need to provide a network solution that allows for dynamic bandwidth control (management) of the broadcast optical network to reduce wasted bandwidth.

SUMMARY OF THE INVENTION

The method and apparatus of the present invention overcome the previously mentioned problems by providing a network element, including an optical switch (switch fabric), and associated control system for a broadcast optical communications network, including an optical switch (switch fabric), to cross-connect selected wavelengths input to the switch to pre-determined output ports, under the control of a control (supervisory) channel, for efficient upstream and downstream delivery of optical communications services. Embodiments of the present invention include an optical switch controller to monitor the communications traffic input to and output from the optical switch ports in order to dynamically change output port connections for the input wavelengths as controlled by the control channel. Further features of the present invention include inserting additional wavelengths into the optical switch for targeted communications services, and providing connectivity to alternate (third-party) communications network via the optical network architecture.

DETAILED DESCRIPTION

Figure 1:
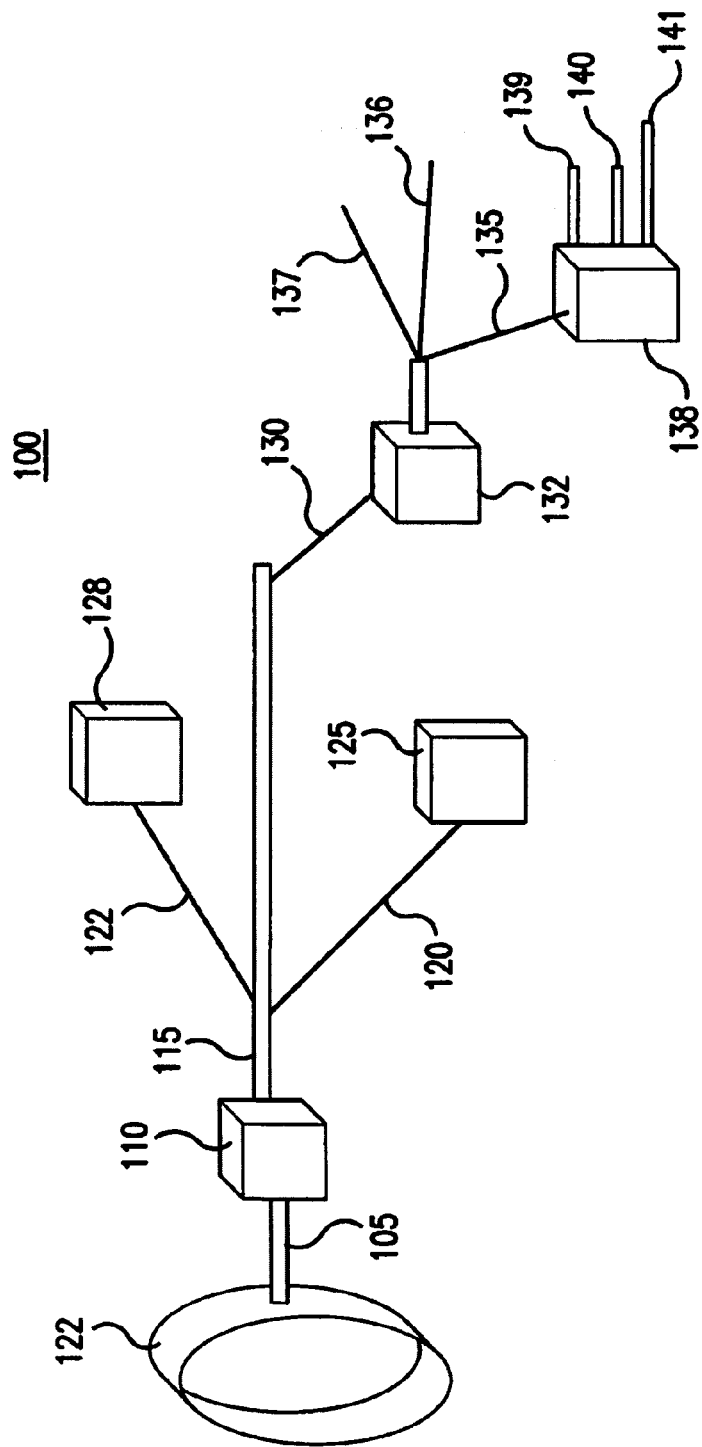
FIG. 1 is a block diagram of an exemplary passive optical network found in the prior art.
Figure 2:
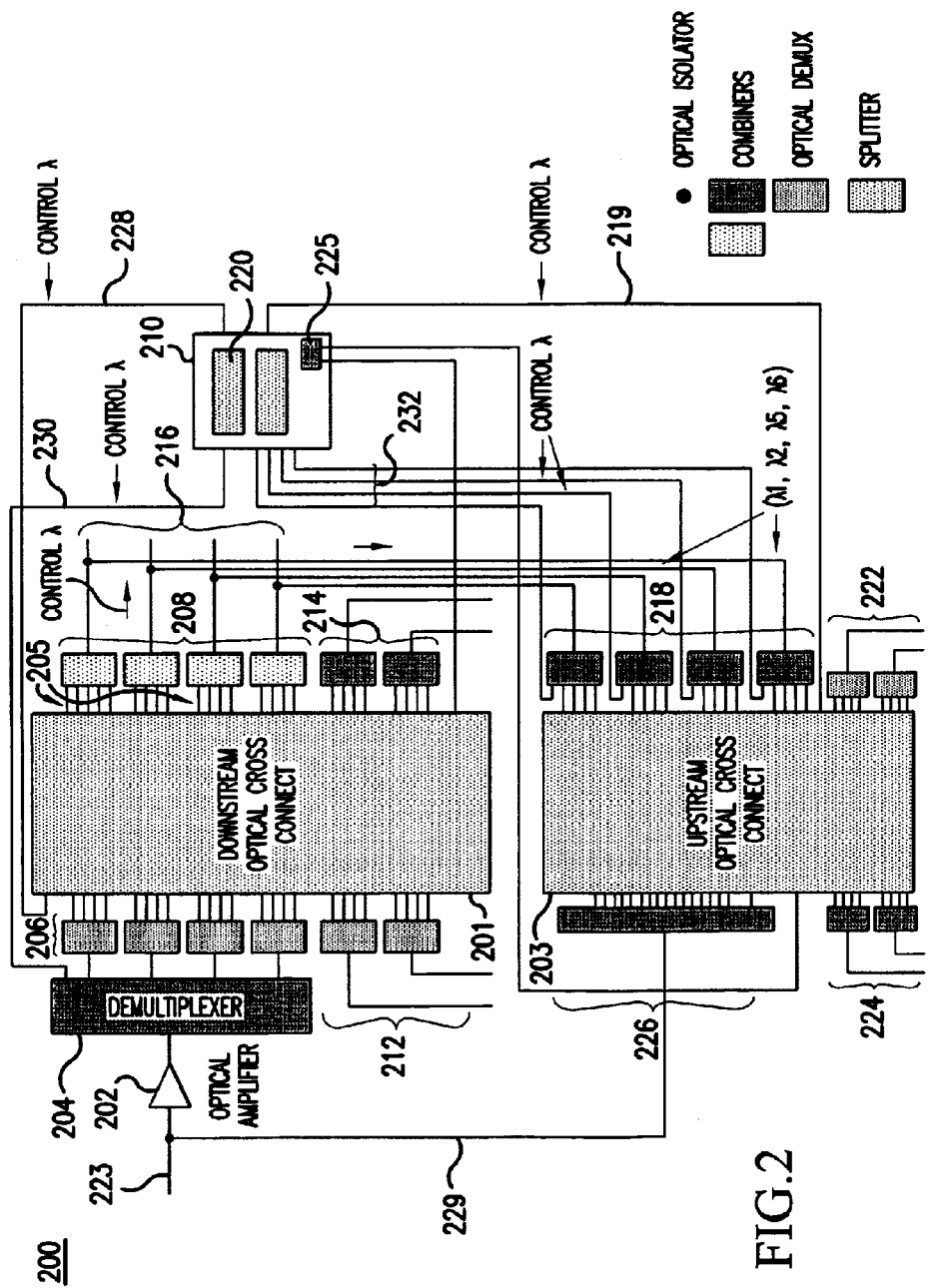
FIG. 2 is a block diagram of an exemplary network element in accordance with an embodiment of the present invention.

FIG. 2 shows a block diagram of an exemplary network element 200 in accordance with an embodiment of the present invention. Advantageously, the network element 200 functions as an optical circuit, including a plurality of passive optical components, capable of supporting a plurality of communication protocols/standards and traffic types (e.g., business, residential, non-native traffic) for delivery of upstream and downstream optical communications services in an optical communications network (not shown) (e.g., cable television network, PON—passive optical network, etc.) for users, including business and residential users. The supported communications protocols/standards may include, but are not limited to, ATM (asynchronous transfer mode), baseband digital, AM-VSB (amplitude modulation—vertical sideband), and QAM (quadrature amplitude modulation), and other optical communications protocols (e.g., OC-xx). Particularly, baseband digital communications signals may be used to provide ethernet communications services for business users of the optical network. Network element 200 may be placed at or downstream from the central office (CO)/headend of the optical communications network.

In a network element portion for communicating downstream to users, network element 200 may include at least one optional optical amplifier 202, optical demultiplexer 204, optical splitters 206, optical switch (cross-connect) 201, optical combiners 208, auxiliary input optical splitters 212, and auxiliary output optical combiners 214. Network element 200 may further include optional optical circulators (isolators) 216 to help separate downstream and upstream communications traffic flowing through the network element.

In a network element portion for communicating upstream to other parts of the optical communications network, network element 200 may include optical demultiplexers 218, optical switch (cross-connect) 203, at least one optical combiner 226, auxiliary input optical splitters 222, and auxiliary output optical splitters 224.

Network element 200 may optionally include a test (loopback) port 225 for testing a wavelength before cross-connecting the wavelength to the output combiners. Although optical switches 201, 203 are shown as separate elements in FIG. 2, downstream or upstream input signals (wavelengths) into optical switches 201, 203 may be cross-connected to either upstream or downstream output ports (combiners). Furthermore, optical switches 201, 203 may be combined into one element (device) to provide upstream and downstream switching (cross-connect) functionality.

As shown in FIG. 2, a programmable switch controller 210, including a central processor 220 and interconnected monitoring (test) port 225, may be co-located with (or positioned separately from) network element 200 to receive and input an upstream and downstream control (supervisory) channel, operating on an upstream and downstream control wavelength (e.g., 1510 nm, 1520 nm), to switches 201, 203 using lines 219, 228, 230, 232, to control switching of input wavelengths, from demultiplexers 204, 218, to output ports within switches 201, 203. The monitoring port 225, interconnected to switch 201, may be used to monitor the operation of switch 201 by providing diagnostics and other information to the controller 210 via central processor 220. In accordance with embodiments of the present invention, optical switches 201, 203 may be built using MEMs (microelectromechanical systems), LCDs (liquid crystal display systems), moveable collimators, or other suitable low-loss equipment allowing a 1 input-to-1 output switching characteristic for the optical cross-connects.

During operation for the downstream portion of network element 200, an incoming optical communications signal from upstream/downstream path 223, carrying a plurality of wavelengths (e.g., RF wavelengths $\lambda 1, \lambda 2, \lambda 5, \lambda 6$, etc.), may be pre-amplified by amplifier 202 upon entering the network element 200. The pre-amplification will help to overcome losses the signal will encounter passing through the rest of the network element 200. The optical communications signal may be input from a CO (central office)/headend, fiber node, another network element, or other optical network device. Advantageously, in an exemplary scenario, a portion of the wavelengths (e.g., $\lambda 1, \lambda 2$, etc.) may represent broadcast wavelengths ($\lambda_b$) that carry communications services (e.g., basic broadcast cable stations—ABC, CBS, NBC, etc.) broadcast to all or a primary portion of the subscribers to the optical communications network. The other wavelengths (e.g., $\lambda 5, \lambda 6$, etc.) may represent target wavelengths ($\lambda_t$) that carry targeted communications services (e.g., premium cable stations—HBO, golf channel, AMC channel, etc.) provided to a pre-determined portion of subscribers to the optical communications network.

After pre-amplification, the demultiplexer 204 separates (divides) the received optical communications signal into the plurality of wavelengths. As shown in FIG. 2, for this example, the optical communications signal is separated into at least four wavelengths (for carrying user traffic) and each wavelength is separately input to the optical splitters 206. Additionally, after demultiplexing, a downstream control wavelength, separate from the user traffic wavelengths carried by the incoming optical communications signal, is input to the switch controller 210 using line 230 from the demultiplexer 204.

Advantageously, in accordance with embodiments of the present invention, the control channel carries switching data to select which output ports that input wavelengths to the switch 201, from demultiplexer 204, are connected during a switching interval ($T_1$). As shown in FIG. 2, the switch controller 210, including central processor 220, may receive the control channel (wavelength) from line 230 output from demultiplexer 204. The control channel may carry diagnostic and control information to the central processor 220 that is processed and used for operation of the optical switches 201, 203, amplifier 202, and other portions of the network element 200. Once processing by the switch controller 210 is completed, the control channel is input, via line 228, to the optical switch 201 to control downstream switching (cross-connecting) including setup of downstream communications traffic paths.

At each splitter 206, the input wavelength is split into a plurality of signals input to the optical switch 201. The downstream control channel is input to the optical switch 201 using line 228 to initiate switching of the input wavelengths to output ports for a pre-determined time ($T_1$) selected by the control channel. During this time $T_1$, the optical switch 201 cross-connects (switches) each input signal from the splitters 206 to pre-determined output ports within the switch 201 to generate (produce) output signals, including control channel signal output 205, that are fed into the combiners 208. Cross-connecting refers to the process of the switch 101 selectively connecting the input wavelength to a particular output port.

The combined output signal from each combiner 208 may be fed into an optical circulator (isolator) 216 to produce output signals, traveling along optical fiber paths, that continue on the downstream path to another network element, users, or other portions of the communications network. The optical circulators are used to isolate the downstream output signals from the upstream input signals, traveling along the same optical fiber paths, coming from further downstream in the network or from users which prevents interference from occurring. In an alternative embodiment, separate optical fibers may be used for the downstream and upstream communications signals to prevent interference, and thus enable the same control wavelength (e.g., 1510 nm) to be used for the upstream and downstream control channel, and eliminate the need for the optical circulators.

Due to the control channel being input to optical switch 201 from controller 210, there is a unique correspondence between the number of outputs from each splitter 206, input to optical switch 201, and the number of input signals fed into each combiner 208. The presence of the control channel generates an additional input signal such that there is one more input signal (control channel signal input 205) into each combiner 208 than output signals from each splitter 206 that are fed into switch 201. Therefore, for n 1:a splitters on the input side of the switch 201, there are n a+1:1 combiners on the output side of the switch 201, the additional input signal, to each output combiner 208, to support the control channel.

As shown for the exemplary network element 200 of FIG. 2, the optical switch 201 is a 16×20 optical switch where four 1:4 splitters 206 generate 16 input signals into the switch 201, and switch 201 cross-connects the input signals, and the control channel input signal, to output ports to generate 20 output signals fed into the four 5:1 combiners 208. It is noted that the 16×20 switch shown is solely exemplary, and any other n×m (# of inputs×# of outputs) switch type may be used that outputs a control channel signal into the combiner(s) for the upstream or downstream path.

As shown in FIG. 2, network element 200 may include one or more auxiliary input splitters (ports) 212, 222 and auxiliary output combiners (ports) 214, 224 for downstream and upstream optical communications. These ports, 212, 214 and 222, 224, may be used to input one or more additional optical communications signals into the downstream and upstream optical communications path. These additional optical signals may include, but is not limited to, optical communications signals from alternate (non-native or third-party) communications networks and additional wavelength (s) input to the downstream and upstream communications path as determined by the control channel received by the switch controller 210. The alternative communications network may include, but is not limited to, wireless and wired communications networks where, as described herein, the additional optical communications signal may be carried between a base station and a mobile telephone switching office of the wireless communications network.

As shown in FIG. 2, auxiliary input splitters 212, 222 may split incoming (downstream, upstream) additional wavelengths into a plurality of signals input to the optical switch 201, 203. The optical switch 201, 203 cross-connects (switches) each input signal from the auxiliary splitters 212, 222 to pre-determined output ports within the switch 201, 203 to generate (produce) output signals that feed into the auxiliary combiners 214, 224. The combined output signal from each combiner 214, 224 may be fed into other network elements, via other auxiliary input splitters (ports) and other auxiliary output combiners (ports), in cascaded downstream and upstream path connection, to users, or to other portions of the optical communications network.

As shown in FIG. 2, during operation for the upstream portion of network element 200, incoming optical communications signals, output from the optical circulators 216, are separately input to a plurality of demultiplexers 218. Each demultiplexer 218 separates (divides) the received optical communications signal into a plurality of wavelengths (e.g., RF wavelengths $\lambda 1$, $\lambda 2$, $\lambda 5$, $\lambda 6$), including an upstream control channel wavelength separate from user traffic wavelengths, carried by each input optical communications signal.

As shown in FIG. 2, the switch controller 210, including central processor 220, may receive the control channel (wavelength) from lines 232 output from demultiplexers 218. The control channel may carry diagnostic and control information to the central processor 220 that is processed and used for operation of the optical switch 203 and other portions of the network element 200. Once processing by the switch controller 210 is completed, the control channel is input, via line 219, to the optical switch 203 to control downstream switching (cross-connecting) including setup of upstream communications traffic paths.

After demultiplexing, the plurality of input wavelengths are separately input to the optical switch 203 from each demultiplexer 218. The upstream control channel is input to the optical switch 203 using line 219 to initiate switching of the input wavelengths to output ports for a pre-determined time ($T_2$) selected by the control channel. During this time $T_2$, the optical switch 203 cross-connects (switches) each input signal from the demultiplexers 218 to pre-determined output ports within the switch 203 to generate (produce) output signals that feed into the combiner 226. Additionally, the switch 203 connects the control channel, input from line 219, to an output port feeding into combiner 226. The combined output signal from the combiner 208, including the control channel, may be fed into the upstream/downstream path 223 using line 229. From path 223, the upstream communications signal may be fed to a CO/Headend, a network element, or other device in the optical communications network.

Again, due to the control channel being input to optical switch 203 from controller 210, there is a unique correspondence between the number of outputs from each demultiplexer 218, input to optical switch 203, and the number of input signals fed into the combiner 226. The presence of the control channel generates an additional input signal such that there is one more input signal into the combiner 226 than total output signals fed into switch 203 from the plurality of demultiplexers 218. Therefore, for every n 1:a demultiplexer on the input side of the switch 203 generating n×a input signals into switch 203, there is an [(n*a)+1]:1 combiner on the output side of the switch 203 being fed [(n×a)+1] input signals, the additional input signal to support the control channel.

Figure 3:
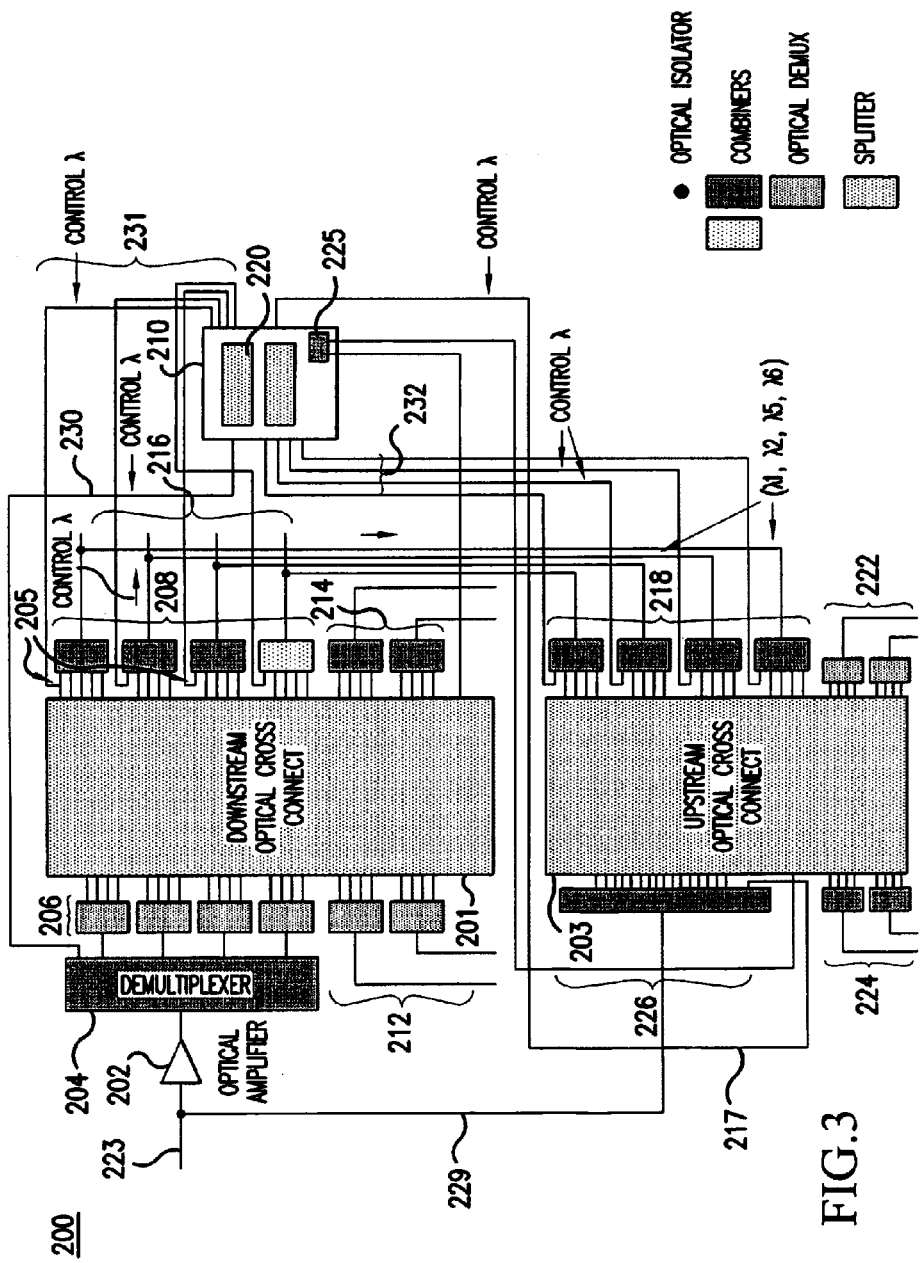
FIG. 3 is a block diagram of an exemplary network element in accordance with an alternative embodiment of the present invention.

In an alternative embodiment of the network element 200, as shown in FIG. 3, the control channel (wavelength) may bypass the optical switch (switch fabric) completely. In the downstream path, after the control channel is separated out by the demultiplexer 204 and processed by the switch controller 210 using line 230, the control channel is fed back into the downstream path as an input to each combiner 208 using lines 231. The central processor 220 may directly initiate the switching of input wavelengths to output ports in the switch 201 for this embodiment.

Similarly, for the upstream path, after the control channel is separated out by the demultiplexers 218 and processed by the switch controller 210 using lines 232, the control channel is fed back into the upstream path as an input to the combiner 226 using line 217. The central processor 220 may directly initiate the switching of input wavelengths to output ports in the switch 203 for this embodiment.

Figure 4:
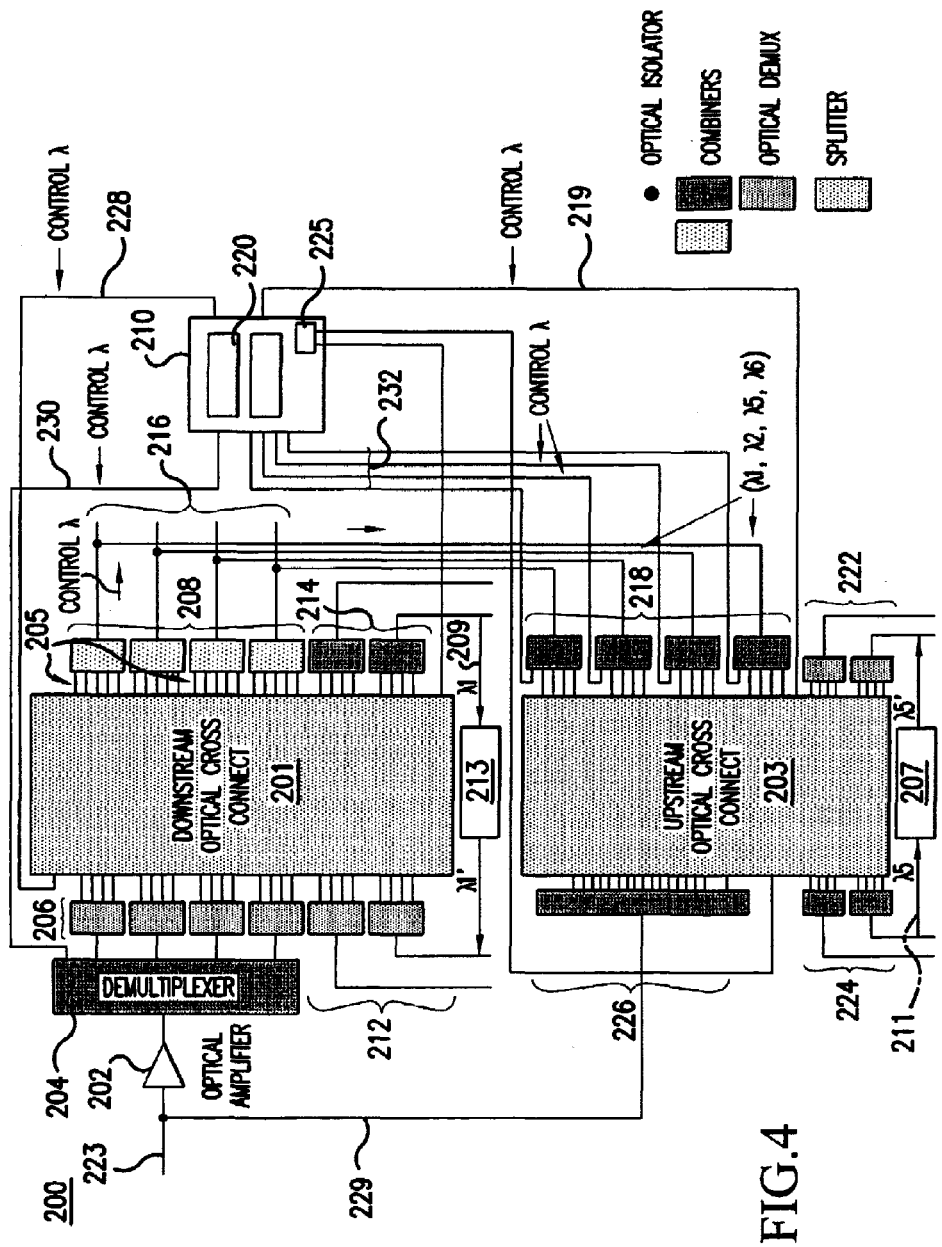
FIG. 4 is a block diagram of an exemplary network element capable of wavelength insertion in accordance with an embodiment of the present invention.

As shown in FIG. 4, additional wavelengths may be inserted into the downstream or upstream communications paths using at least two tunable optical transponder units 213, 207 interconnected to the network element 200. In an exemplary scenario for the downstream path, a λ1 signal input to switch 201 may be output to one of the auxiliary combiner outputs 214. From the combiner 214, the λ1 signal is fed into tunable optical transponder 213 using line 209. The optical transponder 213, including a tunable laser, receives the λ1 signal and converts the λ1 signal into an alternate wavelength (e.g., λ1') that is looped back into the optical switch 201 using one of the auxiliary input splitters 212. When input to the optical switch 201 from splitter 212, the additional wavelength, λ1' may be cross-connected to any output port and fed into any output combiner 208, 214 as selected by the downstream control wavelength.

Similarly, in an exemplary scenario for the upstream path, a λ2 signal input to switch 203 may be output to one of the auxiliary combiner outputs 224. From the combiner 224, the λ5 signal is fed into tunable optical transponder 207 using line 211. The optical transponder 207, including a tunable laser, receives the λ2 signal and converts the λ2 signal into an alternate wavelength (e.g., λ5') that is looped back into the optical switch 203 using one of the auxiliary input splitters 222. When input to the optical switch 203 from splitter 222, the additional wavelength, λ5', may be cross-connected to any output port and fed into any output combiner 226, 224 as selected by the control wavelength. The insertion of the additional wavelength into the upstream and/or downstream path (λ1', λ5') helps to provide particular communications services as requested by users, including business and residential users. Furthermore, as described herein in the software section, the transponders 213, 207 may send a communications signal back to the controller 210 to verify that addition of the alternate wavelength(s) has been completed, and the new wavelength configuration for the network may be communicated back to a network management software system. Furthermore, the control channel may be input to auxiliary input ports (splitters) 212, 222 by inserting a demultiplexer before the auxiliary input ports.

Figure 5:
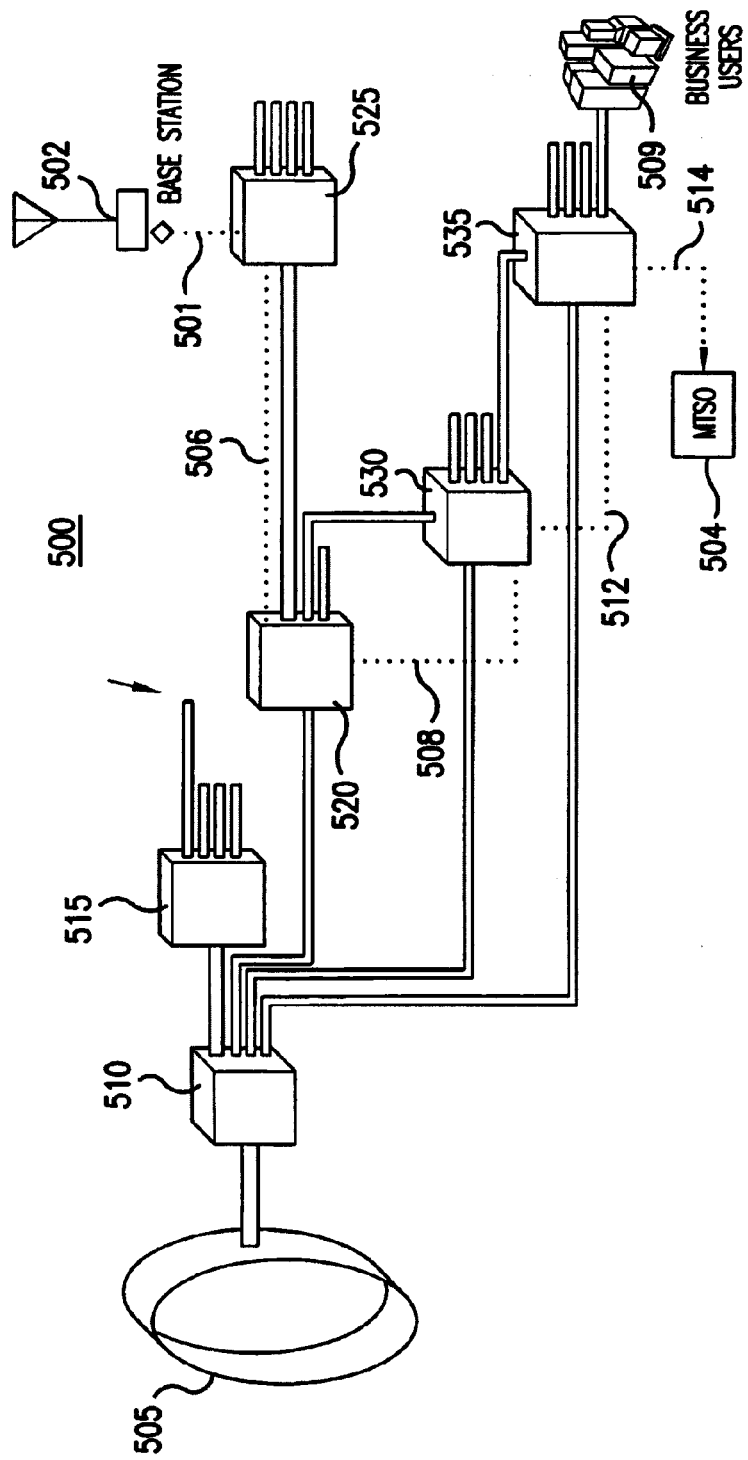
FIG. 5 is a block diagram of an exemplary optical communications network capable of wavelength insertion from an alternate network in accordance with an embodiment of the present invention.

FIG. 5 shows a block diagram of an exemplary optical communications network 500, capable of additional wavelength insertion, to provide connectivity for an alternate (non-native, third-party) communications network. As shown in FIG. 5, the optical communications network 500 includes a CO/Headend 505 interconnected to a plurality of network elements 510, 515, 520, 525, 530, 535 to provide optical communications services to and from a plurality of users such as business users 509. As described herein, the optical communications network 500 may further provide third-party network connectivity between a base station 502 and MTSO (mobile telephone switching office) 504 under the control of a control channel.

From base station 502, an optical communications signal (e.g., carrying a mobile user traffic signal) may be fed (forwarded) into network element 525 using line 501 input to an auxiliary input port (splitter) (not shown) on network 525 for upstream communications. Advantageously, the optical communications signal input into network element 525 may originate as an optical signal or may originate as an electrical signal that is converted into an optical signal using an electrical-to-optical converter (not shown) co-located with or located separately from the base station 502.

At network element 525, the optical communications signal may be cross-connected along with other upstream traffic wavelengths, by the network element optical switch (not shown) as controlled by an upstream control channel, from the upstream auxiliary input splitter to an output combiner (e.g., upstream auxiliary output combiner or regular output combiner). From the output combiner of network element 525, the optical communications signal may be fed, using line 506, into an input splitter (e.g., upstream auxiliary input splitter) or input demultiplexer of network element 520, and then cross-connected over to an output combiner (e.g., downstream auxiliary output combiner) as determined by a control channel. The optical communications signal may be then fed into network element 530 using line 508 input to a downstream auxiliary input port (splitter) or input splitter of network element 530.

At network element 530, the forwarding process may be repeated as the optical communications signal may be cross-connected, by the network element optical switch as controlled by a downstream control channel, from the downstream auxiliary input splitter to an output combiner (e.g., downstream auxiliary output combiner). From the output combiner of network element 530, the optical communications signal may be fed, using line 512, into an input splitter (e.g., downstream auxiliary input splitter) or input demultiplexer of network element 535, and then cross-connected over to an output combiner (e.g., downstream auxiliary output combiner) as determined by the downstream control channel.

From the output combiner of network element 535, the optical communications signal may be fed, using line 514, into the MTSO 504 for further processing (e.g., optical-to-electrical conversion) to complete the wireless communication from the base station 502. Using the same network elements 535, 530, 520, 525, in a reverse path and process (using the corresponding downstream and upstream input and output ports not used for the base station-to-MTSO path), the MTSO 504 may send an optical communications signal to the base station 502. Advantageously, lines 501, 506, 508, 512, and 514 may be optical fiber links to help provide the optical communications path between base station 502 and MTSO 504.

In accordance with embodiments of the present invention, a programmable software control/management system is provided to enable dynamic bandwidth management at the optical layer for the optical communications network, such as network 500 of FIG. 5, comprising a plurality of network elements. The software control system operates to dynamically configure the optical network, including network elements, at the optical layer to provide broadcast communications services ($\lambda_b$) and targeted communications services ($\lambda_t$) to particular subscribers (users). Dynamic configuring at the optical layer enables the network elements to be used for PON and other FTTH (Fiber-to-the-Home) network applications.

Figure 6:
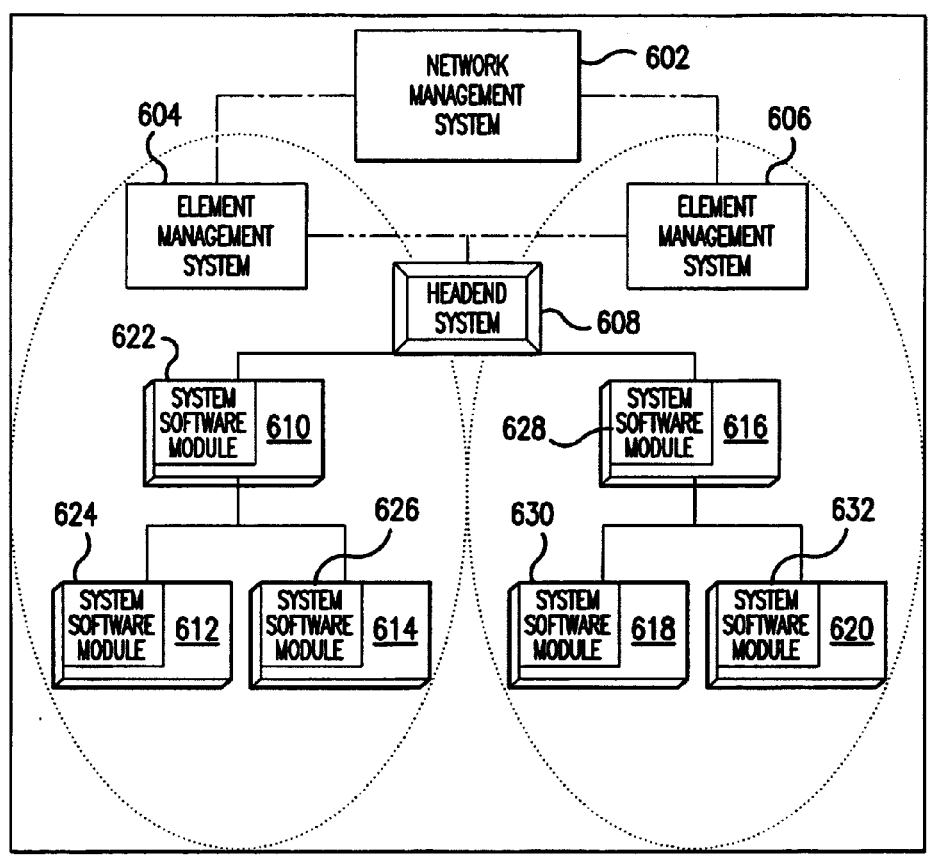
FIG. 6 is a block diagram of an exemplary control system for the network element in accordance with an embodiment of the present invention.

FIG. 6 is a block diagram of an exemplary control/management system 600 for the optical communications network comprising headend 608 and network elements 610, 612, 614, 616, 618, 620 in accordance with embodiments of the present invention. Network elements 610, 612, 614, 618, and 620 are solely exemplary, and although not shown, the optical communications network may include a further plurality of network elements. A primary function of the control system 600 is to operate as an integral support system (ISS) including a plurality of interconnected, programmable software components. As shown in FIG. 6, the ISS software components include a network management system (NMS) 602, and one or more element management systems (EMS) 604, 606. The EMS 604, 606 may be interconnected to a plurality of network elements 610, 612, 614, 616, 618, 620, via an exemplary headend system 608. Each network element 610, 612, 614, 616, 618, 620, includes a system software module (SSM) 622, 624, 626, 628, 630, 632, that is another software component of the ISS.

Figure 7:
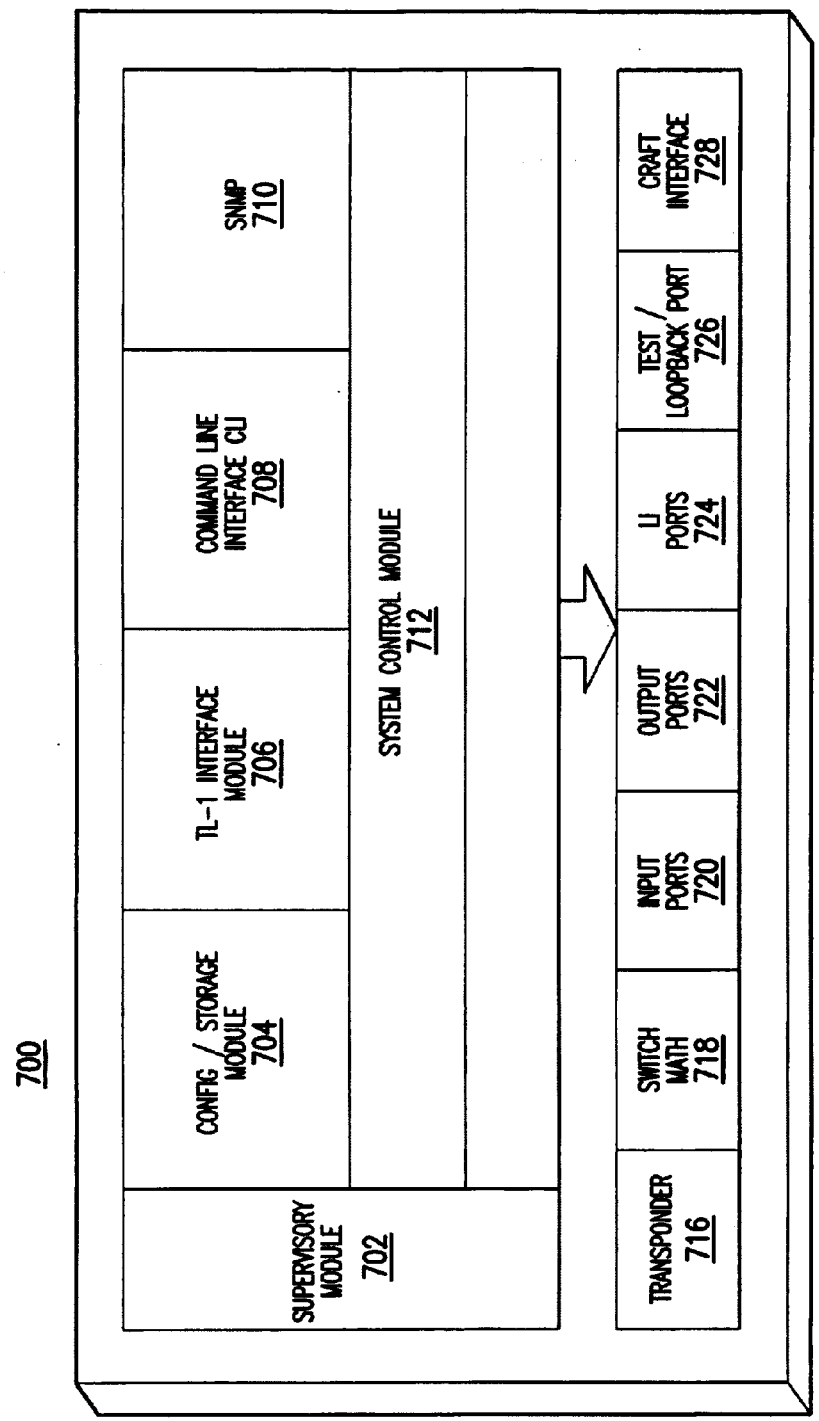
FIG. 7 is a block diagram of an exemplary system software module in accordance with an embodiment of the present invention.

FIG. 7 illustrates an exemplary functional block diagram for an SSM 700. The SSM 700 may have a plurality of interconnected programmable modules including a supervisory module 702, a configuration/storage module 704, a TL-1 (transaction language 1 in accordance with telecommunications management protocol) interface module 706, a command line interface (CLI) module 708, and a system control module 712. Advantageously, the SSM 700 may be operate as the switch controller 210, shown in FIG. 3, and use the central processor 220 as the supervisory module 702. SSM 700 further includes a hardware control interface 714 to interconnect with a plurality of network element components including the transponder 716, switch matrix 718, input ports (splitters) 720, output ports (combiners) 722, line interface (LI) ports 724, test/loopback port 726, and craft interface 728. The supervisory module 702, interconnected to the LI ports 724, and the switch matrix 718, allows the SSM 700 to accept commands/messages from any external source (e.g., EMS 604, 606, NMS 602) to provide a unified interface to the SSM 700. The craft interface 728 allows for easy direct maintenance of the SSM by maintenance personnel using a portable diagnostics unit.

The commands/messages received from the EMS, NMS (e.g., external sources) assist the SSM 700 in controlling the active network element components including switches, transponders, demultiplexers, amplifiers, combiners, splitters, monitoring ports, and circulators. Furthermore, the SSM 700 may perform other functions including, but not limited to, 1) sending periodic status messages to the EMS, 2) alert and event generation, and 3) statistics collection. For proper routing of messages/commands to and from each SSM, the associated network element may include a unique IP (internet protocol) address and message routing may occur over the control channel.

Figure 8:
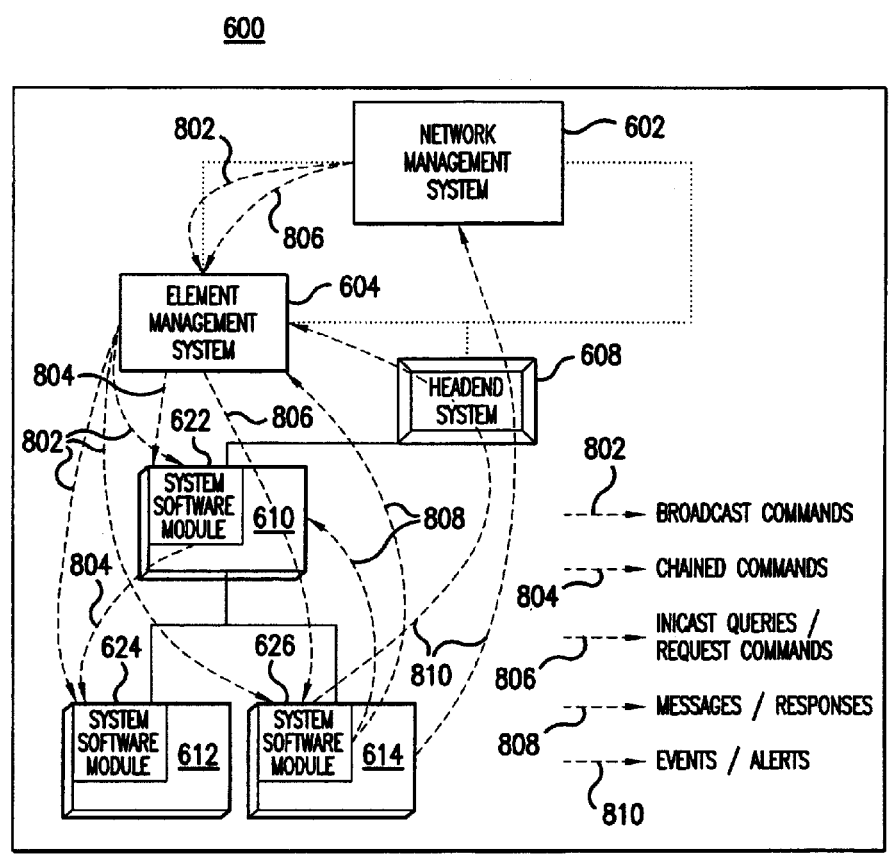
FIG. 8 is a block diagram of an exemplary control system for the network element showing message flow in accordance with an embodiment of the present invention.

FIG. 8 illustrates the exemplary message flow that may occur in the control system 600 between the different control system components, including NMS 602, EMS 604, and SSM 622, 624, 626 components. In accordance with embodiments of the present invention, commands received by the SSM may include a plurality of commands including, but not limited to, direct unicast commands 806, broadcast commands 802, and chained commands 804. Direct commands 806 may be sent (unicast) to the specific IP address of the intended network element, carried by the control channel, and received by the SSM. The direct command may include an actual command or an information query. In an exemplary scenario, EMS 604 may send a direct command 806 to SSM 626 to enable or disable the transponder unit (by enabling or disabling the tunable laser of the unit) at that network element 614 using the specific IP address for network element 614. Alternatively, EMS 604 may send a direct command 806 to SSM 626 to adjust the optical amplifier (e.g., increase gain equalization) at the network element 614.

Advantageously, the execution of a direct command by the SSM 626 may comprise a two-step process where the first step is actual execution of the received direct command 806 (e.g., disable transponder), and the second step is providing a response message (feedback) 808, over the control channel, for the execution of the command to the EMS 604 (e.g., failed, completed).

As shown in FIG. 8, broadcast commands 802 are common commands sent to each SSM 622, 624, 626 from the EMS 604. An exemplary broadcast command may be a supervisory poll sent to each SSM to check status. A chained command 804 is a command from the EMS sent to a first SSM (e.g., SSM 622 of network element 610), executed at the current SSM, and then forwarded to a succeeding SSM in the downstream path. The process is continued until the downstream path of SSMs (network elements) has been completed.

Additionally, the SSM may generate requests and messages for other software components (e.g., EMS, NMS, other SSMs) based on state information. Messages and state information, in the form of events/alerts 810, may be sent periodically from the SSM 622, 624 to the EMS 604 and/or NMS 602, over the control channel, to show alarms and conditions. Statistics and counters, in the form of messages 808, may be sent periodically from the SSM 626 to the EMS 604 to gather information such as information that is collected and collated at the EMS 604 for export to billing systems. The SSM 622, 624, 626 may generate requests/messages, in the form of messages 808 or events/alerts 810, in at least two directions. The SSMs 622, 624, 626 may send requests in the upstream direction to the EMS/NMS 602, 604, for example, to request change in state information such as bandwidth on demand for local insertion of additional wavelength(s). Also, the SSMs 622, 624, 626 may send requests in the downstream direction to other SSMs (network elements, not shown), for example, to request state and availability information including debugging codes and frames to assist in downstream optical communications.

In reference to FIGS. 6 and 8, the EMS 604, 606 may operate as a separate software program that interfaces with the SSMs 622, 624, 626, 628, 630, 632 to control features of the network elements 610, 612, 614, 616, 618, 620. The EMSs 604, 606 may be built on the same platform as NMS 602, and may provide a graphical user interface (GUI) allowing a user to configure and cross-connect across the plurality of network elements 610, 612, 614, 616, 618, 620 within the optical communications network. The EMS 604, 606 may receive the user request and translate the user request into at least one command that is sent to the SSMs in the network, and also verify that the correct command has been executed by an SSM and that network state information received from the element (from a response or event/alert message) is accurate. Furthermore, the EMS 604, 606 may perform other functions including, but not limited to, 1) managing the communications traffic that enter a network element, 2) monitoring the traffic on input and output ports for a network element, 3) reporting alerts and diagnostic information received from an SSM to the NMS 602, and 4) collecting and collating statistics information generated by the SSM at a network element.

In reference to FIG. 8, the EMS performs traffic management by setting up cross-connects at a network element in one of broadcast 802, multicast 804 (chained command), or unicast 806 mode, as selected by user input from the GUI, by sending commands over the control channel that are subsequently executed by the SSM at the network element. In an exemplary scenario, in reference to FIGS. 2 and 6, EMS 604 may send a broadcast command to network elements 610, 612, 614 (via SSMs 622, 624, 626) to cross-connect an incoming wavelength (e.g., λ2), carried by the incoming optical communications signal, from an input port to the optical switch to three of the output combiner ports 208.

The EMS may perform traffic monitoring by periodically receiving traffic monitoring information, in addition to alert/event messages 810, from the SSM. Alternatively, the EMS may send a query to the SSM to respond with traffic information regarding particular ports (e.g., in response to a trigger) of the network element as selected by the EMS. For example, EMS 604 may send a query to SSM 622 to respond with traffic information (event/alert message 810) regarding one of the output combiners 208 when traffic outgoing from the combiner exceeds a pre-determined threshold trigger.

Incoming traffic to a network element may include a plurality of traffic types including pre-provisioned and on-demand traffic. Pre-provisioned traffic may include incoming traffic flow that has been pre-determinedly mapped by the EMS from an input port to one or more output ports on the network element. On-demand traffic may include incoming traffic that has not been pre-determinedly mapped for cross-connect, or traffic that is set aside as "deactivated". The occurrence of on-demand traffic may trigger an event/alert message 810 sent from the SSM to the EMS that prompts the EMS to send back cross-connect information, over the control channel, in response. Alternatively, the EMS may escalate (forward) the event/alert message 810 to the NMS that prompts the NMS to control the cross-connect of the "delayed" on-demand traffic based on having network-wide information on the state of the network.

Additionally, based on the messages received from the SSMs, the EMS stores information regarding online, offline, and faulty ports within the network, including those ports currently processing communications traffic. Furthermore, the EMS performs statistics collection by collecting and collating the statistical information received from the SSM (from an 808, 810 response or event/alert message), and forward this statistics information to the NMS. An individual EMS may control and configure a plurality of network elements.

In reference to FIG. 6, NMS 602 manages each EMS 604, 606 and operates as the primary controller (network manager) in the system 600 for controlling an optical communications network. The primary function of NMS 602 is to establish and manage sessions (control activity/management sessions) for the system 600. Exemplary sessions include, but are not limited to, 1) providing more bandwidth to a particular network segment, 2) setting up, tearing down, or resizing a portion of the network during a given time period, 3) supporting a new optical path through a particular portion of the network. To provide more bandwidth, in an exemplary scenario, NMS 602 may send a command message 806 to EMS 604 instructing EMS 604 to send a broadcast command 802 to SSMs 622, 624, 626. The broadcast command 802 may instruct SSMs 622, 624, 626 to insert an additional wavelength (e.g., λ5') into the optical downstream path using the individual transponder for each respective network element 610, 612, 614.

During the establishment and operation of a control management session by the NMS 602, it is useful that all SSMs in that network portion may communicate with each other. Advantageously, in accordance with embodiments of the present invention, a virtual private network (VPN) may be used to interconnect all SSMs 622, 624, 626 under the control of an individual EMS 604 during the a control management session established by the NMS 602. The VPN allows each SSM 622, 624, 626 to have access to all operation information about each associated network element 610, 612, 614, the information including information about the ports and transponders for each network element 610, 612, 614. The VPN may operate using an advantageous communications protocol including, but not limited to, IP, ATM, OSPF (open shortest path first), MPLS (multi-protocol label switching), or any combination thereof.

The NMS 602 may query EMS 604, 606 and/or SSMs 622, 624, 4626, 628, 630, 632 for network state information (past and present) to assist in the setup of new services and for billing purposes. Advantageously, the NMS 602 may interconnect to other administrative systems such as Provisioning and Billing using an appropriate software architecture including, but not limited to, CORBA, JAVA, IIOP, and other useful software architectures.

Using the query responses from EMS 604, 606 and SSMs 622, 624, 626, 628, 630, 632, the NMS 602 operates as a network state machine (NSM) to maintain the complete state (using a Network State Table (NST)) of the optical communications network. The network state information is used as a baseline source of information to provide enhanced services in the network. Relating to functioning as a NSM, NMS 602 provides a plurality of services including, but not limited to, 1) providing real-time or near real-time information about the state of the network, 2) polling SSMs to respond with state information, and assembling response messages and information to update the network state information, and 3) save network state information snapshots to provide historical and trend information, and 4) interface and support other feature modules.

To generate a baseline database for the NSM and to maintain the NST, NMS 602 performs a plurality of functions including, but not limited to, auto-discovery, auto-layout, link-state updates, state machine updates, and customization capabilities. These functions may be performed under the direction of the NMS using individual software feature modules (applications) for each function accessible via an API (application programming interface) and interconnected to a working terminal. Auto-discovery, advantageously the first step in achieving "state-awareness", is performed by an individual SSM to discover all other SSMs (and associated network elements) in the network, and is performed by all EMSs and NMSs to discover all network elements in the network. The primary objective is for the NMS to gather all detailed network-awareness information based on the discovery and polling information collected by the EMS. Auto-discovery enables the NMS to build a baseline NSM that allows for a cross-connect matrix (matrix of cross-connects set up at individual network elements) to be periodically updated. Furthermore, the NSM may be accessed by other feature modules such as auto-layout (for providing a network map display), and other feature modules.

Figure 14:
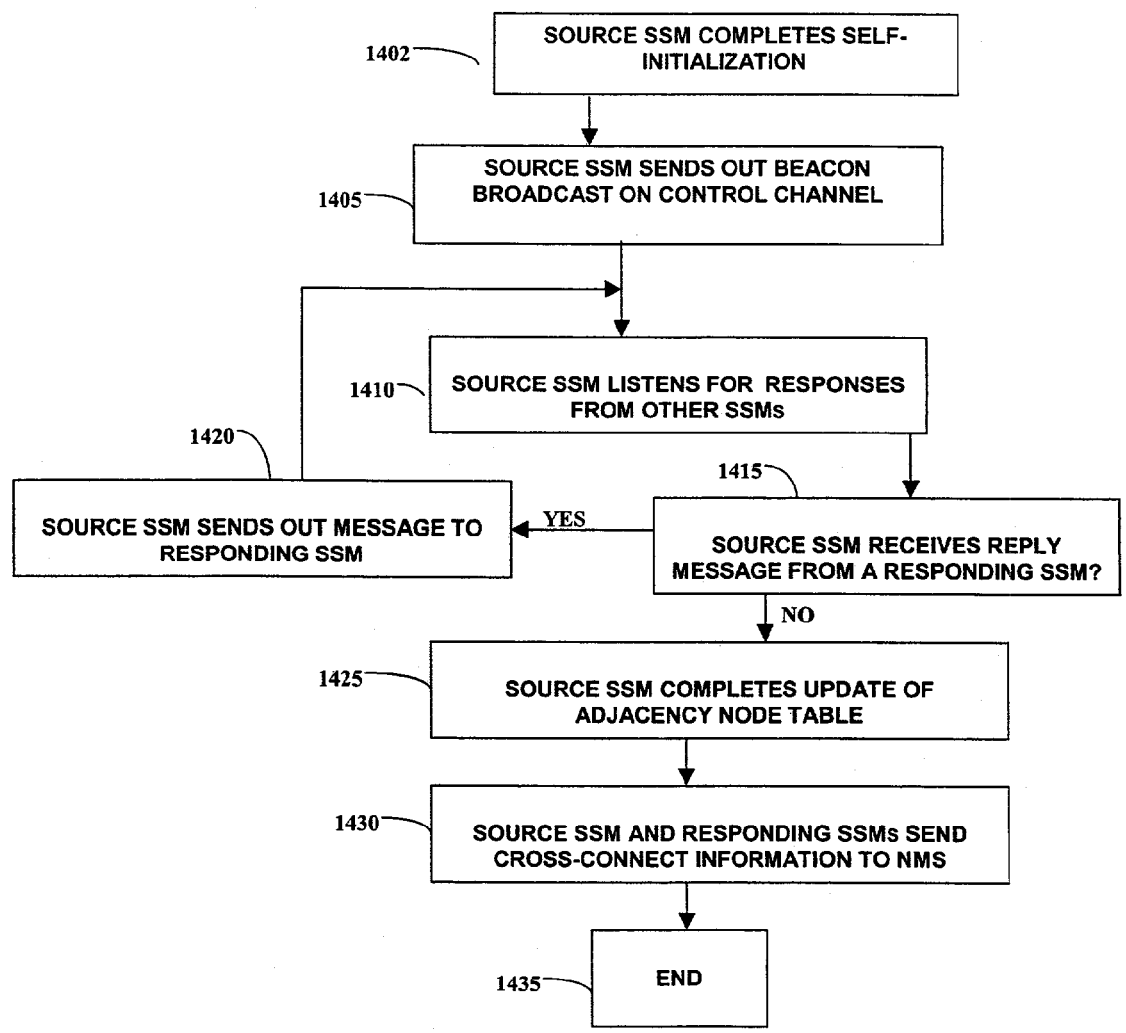
FIG. 14 shows a flow process diagram to perform auto-discovery in accordance with an embodiment of the present invention.

FIG. 14 illustrates an exemplary flow process diagram to perform auto-discovery within the network. Advantageously, this process may be performed with the assistance of an auto-discovery module within the NMS. At step 1402, a source (originating) SSM performs and completes a self-initialization process to determine that all network element components and component working condition. At step

1405, a source (originating) SSM (using its associated network element) sends out a beacon broadcast on the control channel to initiate a response (e.g., unicast message) from all active, listening SSMs in the network. At step 1410, the source SSM listens for any responses that may carry type and model information for the responding SSMs. At step 1415, a decision analysis is performed to determine whether a reply was received from another SSM. If yes, then at step 1420 the source SSM sends out an individual unicast message to the responding SSM to initiate building of an entry in an adjacency node table (ANT). Also, the responding SSM initiates building of its own ANT. The ANT holds information relating to adjacent network elements (nodes) in the network.

Thereafter, steps 1410, 1415 and 1420 are repeated until a response has been received from every active, listening SSM in the network. Once every SSM has responded, the decision analysis at step 1415 produces a negative response (no), and then at step 1425 the source SSM completes the building (updating) of its own ANT. At step 1430, the source and responding SSMs send their cross-connect information (information relating to the network element switch including ANT information), for that network portion, to the NMS to initiate building of the NSM and NST. If the ANT is empty from the source node (SSM), then the NMS recognizes the source SSM as the first node in the network. At step 1435, the process terminates (ends).

The NMS reorganizes the received messages and builds a hierarchical model of interconnection and adjacency nodes to provide a baseline for the succeeding process of auto-layout. Furthermore, the NMS may poll the source and responding SSMs to get more required information including, but not limited to, information on the input wavelengths, output cross-connect wavelengths, insertion wavelengths, and return paths. This additional information assists the NMS to build a global cross-connect matrix (included within the NSM) that is maintained by periodic status updates.

The existence of a late insertion wavelength at a particular SSM may trigger an auto-reconfigure message to be sent to the NMS indicating that a change has occurred in the cross-connect matrix (reconfiguration). This auto-reconfigure message may be followed by a more detailed message describing the insertion wavelength and routing update from the SSM. Alternatively, the NMS may query the SSM to validate the information about the auto-reconfigure messages.

For auto-layout, the NSM may be laid out (as a visual map) on the working terminal using the information collected by the NMS (during auto-discovery) and using a user interface module (UIM) as described herein. This layout may represent a logical topographical overview of the network including all interconnected devices in the downstream and upstream communications paths. The auto-layout may initially only summarily display the discovered information on the terminal, and then the position of the objects can be changed around to show or depict actual physical layouts (as mapped to the associated logical layout).

Figure 16:
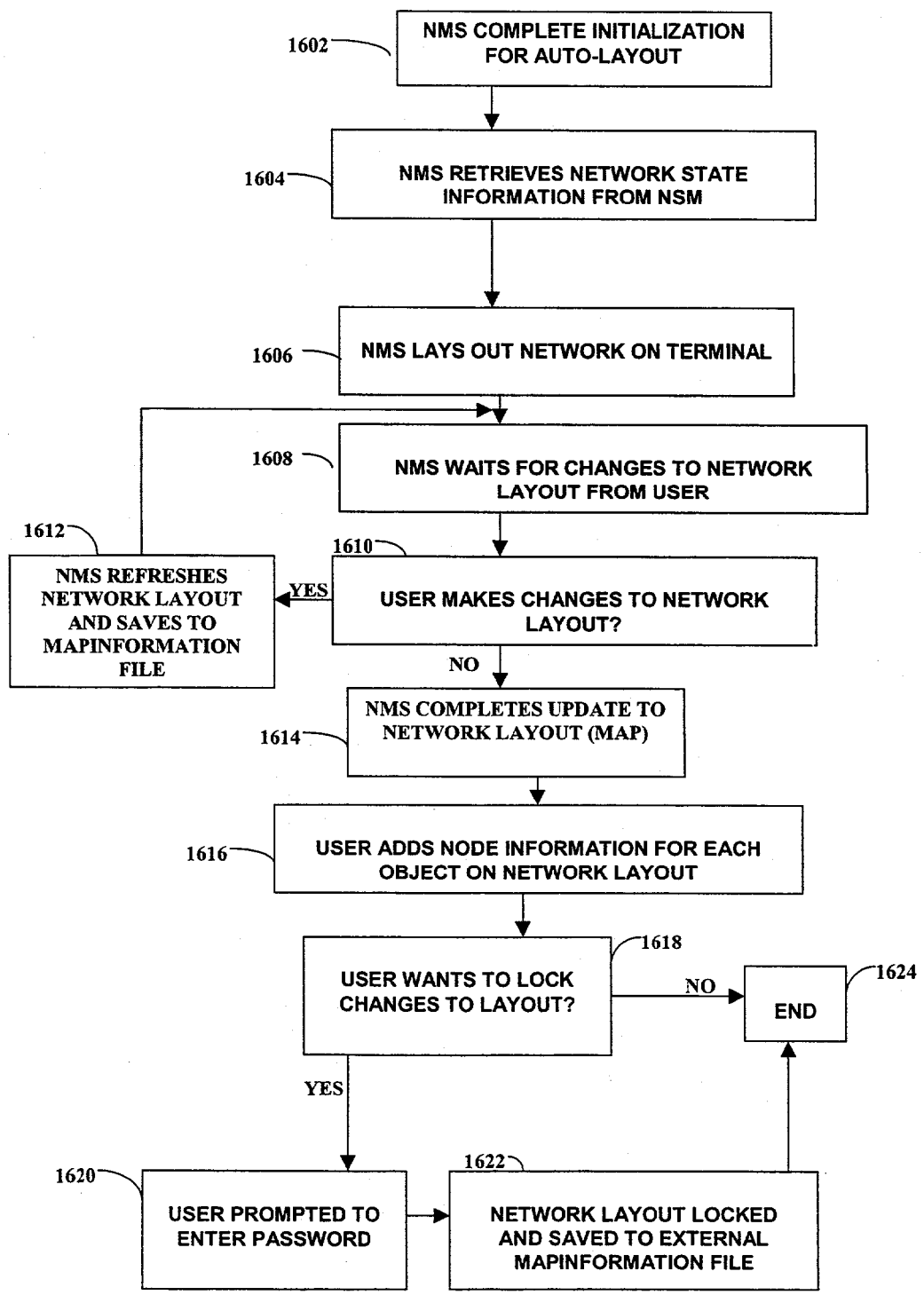
FIG. 16 shows a flow process diagram to perform auto-layout in accordance with an embodiment of the present invention.

FIG. 16 illustrates an exemplary flow process diagram to perform auto-layout within the network in accordance with an embodiment of the present invention. Advantageously, this process may be performed by an auto-layout module within the NMS that attempts to depict the nodes and the inter-connectivity between the nodes in the network in accordance with a pre-determined scheme (rules). At step 1602, the NMS performs an initialization process (validating control system components) to begin the auto-layout function. At step 1604, the NMS retrieves network state information, as collected during the auto-discovery process, from the NSM. At step 1606, the network elements (nodes) are laid out on the working terminal by the NMS(via the UIM) in a logical order that may be based on a pre-determined element identification and inter-element connection scheme (e.g., IP addresses for network elements). For discerning the upstream and downstream paths, the logical order of network elements may primarily show the downstream connectivity path as it may be assumed that the upstream connectivity path is substantially identical to the downstream path.

At step 1608, the NMS waits to see if the user (operator) makes any changes to the network logical layout. Advantageously, the user may make changes to the network layout by mapping the logical layout to the physical (geographical) layout of the optical communications network. At the terminal, network elements may be queried to show details on the cross-connected traffic and element identification. Changes may be made using the customization capabilities as described herein.

At step 1610, a decision analysis is performed to determine whether any user changes have been made to the network layout. If yes, then at step 1612 the network layout is refreshed on the terminal (showing the changes made by the user) and the modified layout is saved by the NMS as an external MapInformation file on the working terminal. Thereafter, steps 1608, 1610, and 1612 are repeated (with further updates to the MapInformation file) as long as the user continues to make changes to the network logical layout.

Once changes are completed by the user, the decision analysis at step 1610 produces a negative response (no), and at step 1614 the NMS completes the update of the network logical layout (map) and refreshes the network layout on the terminal. At step 1616, the user optionally adds node information for each object (e.g., link, network element, etc.) on the network map.

Thereafter, at step 1618, a decision analysis performed to determine whether the user wants to "lock" the changes to the network layout. If no, then the process terminates at step 1624. If yes, then at step 1620 the user may prompted to enter a password to validate the locking procedure. Thereafter, at step 1622 the modified network layout is locked and saved as an external MapInformation file to the terminal and to the NMS. Locking of the layout allows for the exact same layout to be used every time the layout is accessed by the system or user. At the time of locking, the position and layout attributes of each of the screen objects (e.g., links, network elements, etc.) are saved along with the layout where the layout access may be protected by a user password to prevent unauthorized access to the layout.

Thereafter, at the next viewing of the network layout, the NMS first checks to see if a MapInformation file currently exists. If yes, then the layout is displayed using the information within the file. If no, then the auto-layout module is invoked automatically and the process of FIG. 16 is performed.

Figure 15:
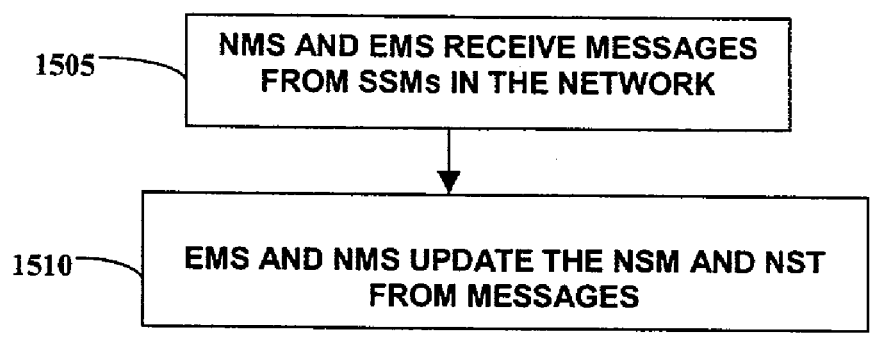
FIG. 15 shows a flow process diagram to perform network state machine updating in accordance with an embodiment of the present invention.

FIG. 15 illustrates an exemplary flow process diagram to perform NSM updating within the network. At step 1505, all SSMs in the network collect and send information messages to the EMSs and NMSs. These messages include information regarding the active components (e.g., switches, combiners, amplifiers, input wavelengths, etc.) and information regarding enhanced services (e.g., wavelength insertion) that have been activated at a particular network element. At step 1510, the EMS and NMS receive and translate the information messages, and make updates to the NSM and NST. Although the activation of enhanced services may not change the physical topography of the network, this information is included in the messages to the EMS and NMS (and update to the NSM) to track wavelength flow/selection for targeted services.

NMS 602, functioning as a NSM, may have customization capabilities (implemented as software feature modules to assist the auto-layout feature) including, but not limited to, physical geographical map correlation, layout layering, and skin/template management. Physical geographical map correlation allows the user to correlate the network layout (map) to the actual physical network by providing information regarding geographic maps, cable routing paths, splitter junctions, and other detailed physical information on the network. For example, an actual physical map showing the geographic terrain of the network may be superimposed on the network logical map with fine granularity (exactness). This exact or precise mapping may be performed by importing multiple maps of the exact routing and layout of the network (using the UIM module) allowing the existing, physical network to be dropped over the logical layout to show actual geographic areas. Thereafter, the user may make changes to the logical layout (e.g., output wavelength port may be changed in response to physical distance that must be covered).

Layout layering allows the user to take images, comprising the backgrounds for the network map, and divide the images into multiple layers to show different attributes (e.g., number of wavelengths, number of nodes, etc.) of the network that may be brought out to exemplify the network properties and granularity of operation. The multiple layers may be setup by the user where each of the objects (e.g., network elements, links, etc.) may be assigned a particular layer, or automatically setup in pre-determined default layers by the NMS (via the UIM). For example, a snapshot of the NSM may be taken after auto-discovery, and then periodic updates to the NSM may be automatically reflected in the layout layering. Furthermore, the visual map of the working terminal may be modified to show or hide certain layers on a single view.

Advantageously, skin/template management may be used in combination with layout layering. The look and feel of the layout windows may be defined as the "skin" of the network layout and different skins may be setup as templates for the layout layering where each skin may be enabled/disabled upon user selection.

Figure 9:
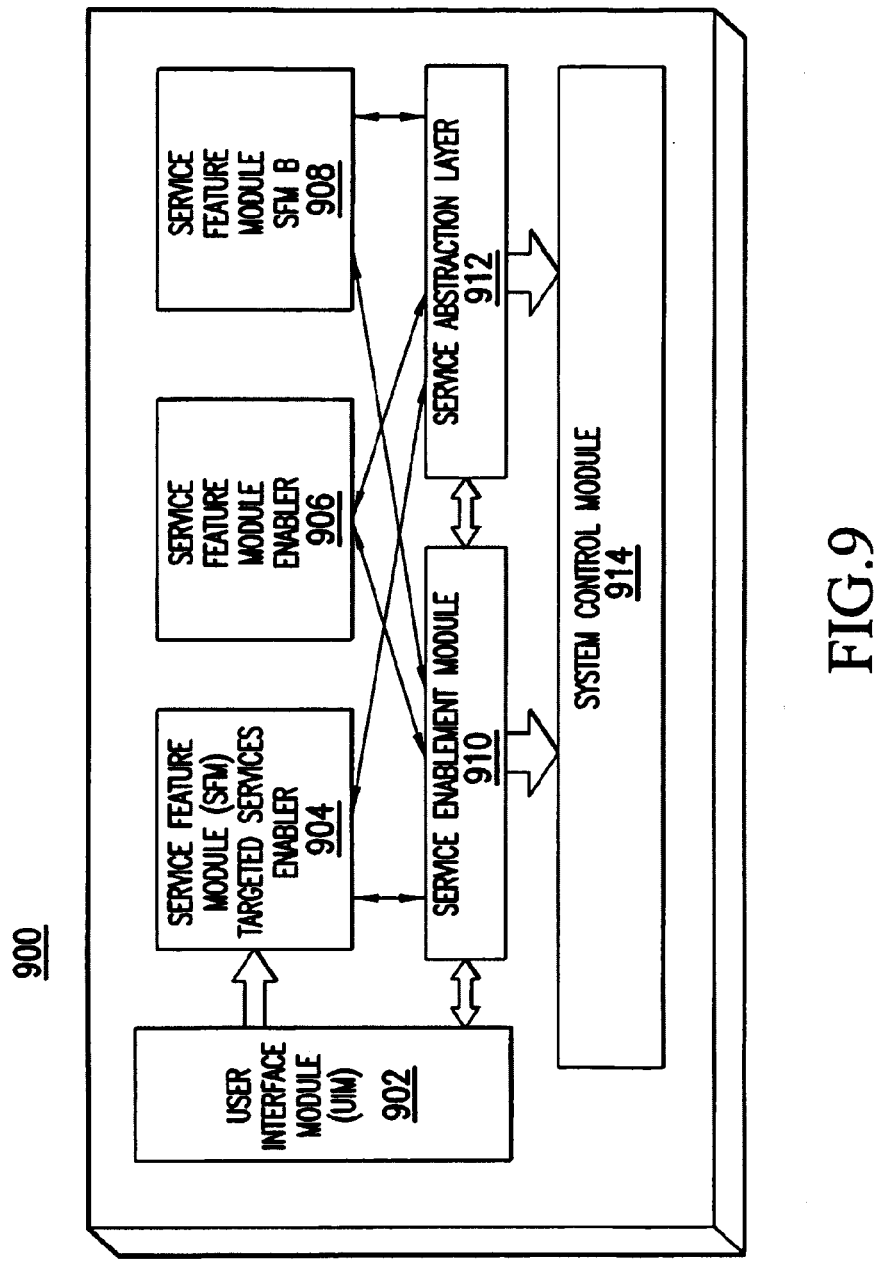
FIG. 9 is a block diagram of an exemplary service enabling system in accordance with an embodiment of the present invention.

One of the plurality of features supported by NMS 602, in conjunction with the plurality of network elements 610, 612, 614, 616, 618, 620, is the provision of targeted communications services to users (e.g., end users) using bandwidth control. In accordance with embodiments of the present invention, as shown in FIG. 9, NMS 602 may include an exemplary service enabling system (SES) 900 to provide the targeted communications services. SES 900 operates to provide a plurality of services. These services may include, but are not limited to, 1) providing a plurality of PON networks over the same physical link, 2) provide channelized wavelength switching based on a target community of users, and setting up one or more wavelengths to carry service offerings that are targeted to that community, 3) providing a software layout map to compare to a physical layout of target communities for different features, 4) providing, in fine granularity, the layout and effect on the communications network and bandwidth management for enabling targeted services.

SES 900 uses the state awareness of the network, provided by the NMS 602 operating as a network state machine as described herein, to provide targeted services. SES 900 includes a plurality of interconnected, programmable service enablement-related modules and components. These components include a user interface module (UIM) 902 (may be interconnected to a working terminal—not shown), a plurality of service feature modules 904 (target services enabler—SFM-TS), 906, 908, service enablement module 910, service abstraction layer (SAL) 912, and system control module 914.

UIM 902 provides for the initiation, display, configuration, status information, and advanced capabilities of service enablement as operated by a user (e.g., network service provider). SEM 910 receives, using the EMSs 604, 606 and/or SSMs 622, 624, 626, 628, 630, 632, summary information on the state of the network from the NSM and uses that as baseline information for the target service enablement. Also, SEM 910 displays the current state map of the network using the UIM 902, and monitors the input and output links from the SSMs (and associated network element) for adjustment.

SEM 910 may be customized and provides an open interface to all service feature modules 904, 906, 908, and includes an internal generic programming interface that allows for specific feature sets to be developed rapidly without the need to rewrite all levels of the command structure.

During the operation of service enablement, the service feature modules (SFM) 904, 906, 908, receive input data from the UIM 902 and process the input data in accordance with network state information received (via the EMSs and SSMs in the network) and determine a topological impact on the network (e.g., insert an additional wavelength into a particular network portion). This determination is translated into commands (e.g., commands 802, 804, 806) that are sent by the SEM 910 (via the SCM 914) to different areas of the network, include those affected (targeted) portions of the network (e.g., EMSs, SSMs, and associated network elements for that network portion). Then, the SEM 910 signals the SCM 914 to check for the availability and capability of supporting those selected services to the targeted network elements. A control path is established (by SCM 914) to the targeted SSMs, and commands (e.g., unicast 806, broadcast 802) are sent to the targeted (affected) SSMs to activate the targeted service (e.g., additional wavelength insertion).

Upon configuring the targeted service enablement, the SCM 914 sends an update to the SEM 910 to confirm service activation, and the SEM 910 signals the user, via UIM 902, of service activation. Additionally, SFMs 904, 906, 908, update the NST with service activation information using the SAL 912 where the SAL 912 forms the internal repository of service activation information before passing through the information to the NST.

The different modules of SES 900 provide a plurality of functions. The Targeted Services Enabler (SFM 904) allows a network service provider to customize the content of the network by intelligently managing the routing and destination for delivery of services. The content and bundling of these services may be catered to a particular customer group that has been profiled and determined using demographic information. This ability to customize allows the service provider to delivered targeted services to a pre-determined audience (users) enabling greater service penetration to customers, efficient management of network bandwidth (reduces wasted bandwidth for broadcast services), and increased revenue for these targeted services.

Figure 10:
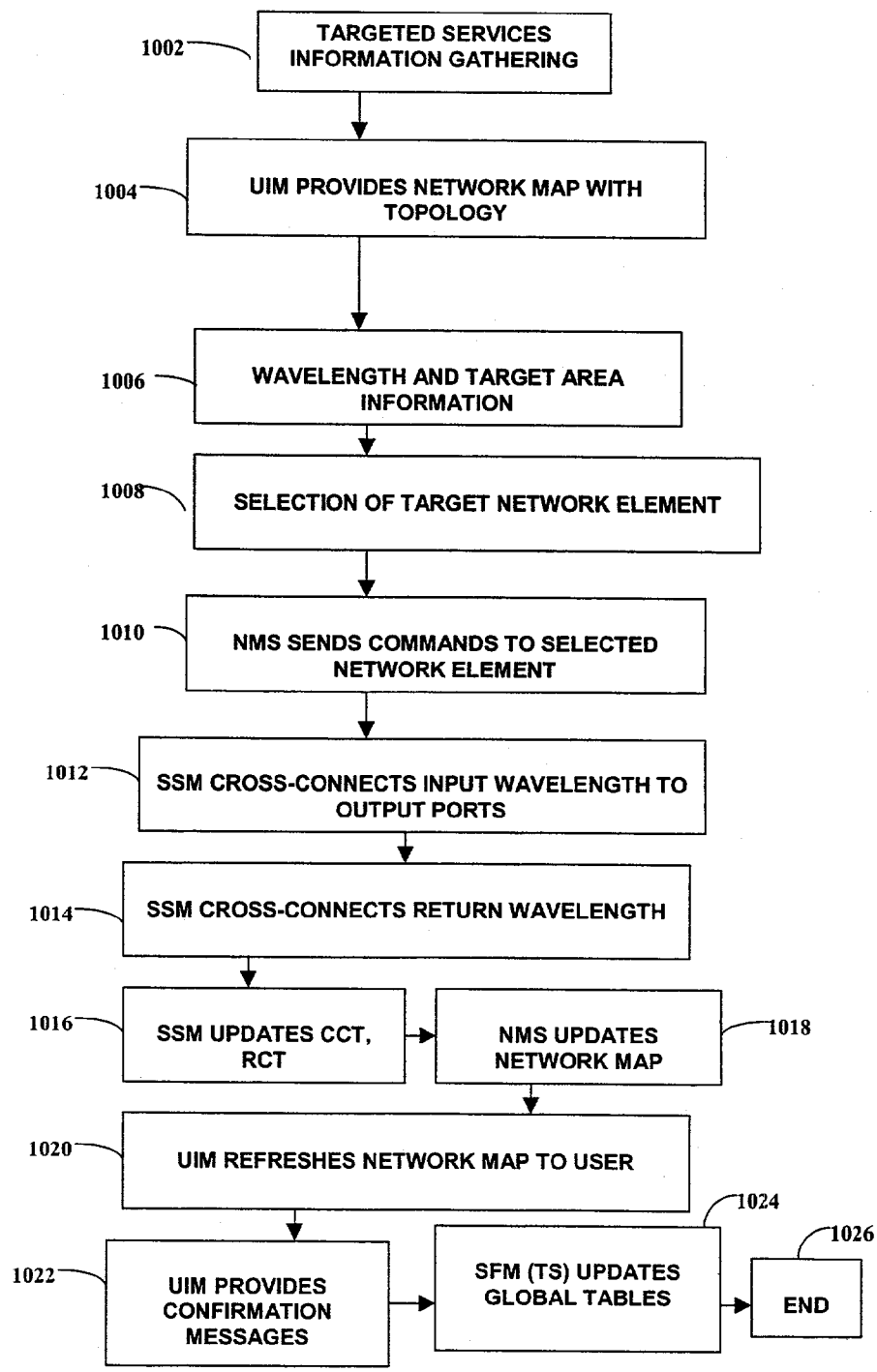
FIG. 10 shows a flow process diagram to activate targeted communications services in accordance with an embodiment of the present invention.

Targeting and activating services (service enablement) for a particular group of users, via the SES 900 and SFM 904, follows a pre-determined process. FIG. 10 illustrates the flow process diagram to activate targeted communications services in accordance with embodiments of the present invention. At step 1002, targeted services information gathering is initiated. From demographic and other (e.g., user surveys, etc) information, a target community of users is selected for activation of the targeted services. At step 1004, to assist in determining the geographic topology for the optical network and correlating the geographic topology with the reach and control span of the network element positions in the network, the UIM 902 provides a display of the network map. The network map, via the UIM 902, may be customized to the optical network to overlay the logical reach of the optical network with the actual (geographical) layout reach of the network and the actual community of users that have access. The network map may then, via the UIM 902, display the positions of the network elements on the network, where this positional information is derived from the NSM, to assist the user in defining the target area for the customized services.

At step 1006, the target area is determined, via UIM 902, and an input wavelength (e.g., λ6') is selected to carry the targeted services to the selected community of users. At step 1008, a target network element (and associated SSM) is selected that acts as the primary network element to start the path of targeted services to the selected community, and determines a continuing path of network elements (that are accessed and configured) to deliver the targeted services to the selected user community. Alternatively, a user, via UIM 902, may manually plot a continuing path of network elements to route the selected wavelength to the target area(s) (e.g., via multi-casting).

To initiate delivery and activation of targeted services, at step 1010, the NMS sends commands (e.g., unicast command 806) to the primary network element including port and destination information for the input wavelength carrying the targeted services. At step 1012, the associated SSM (at the primary network element) cross-connects the input wavelength to at least one pre-determined output port based on the target area for the selected services. After cross-connecting, the SSM updates a local network state table for the downstream portion. This cross-connection process is continued down the path of network elements until the targeted community of users is reached.

In the upstream path, at step 1014, a return control wavelength, carrying information from the downstream network elements in the targeted services path, is cross-connected along a reverse path to the primary network element. At step 1016, at the primary network element (and associated SSM), a local cross-connect table (CCT) and reverse-connect table (RCT) is updated. At step 1018, this update information is sent to the EMS and NMS as network state information and an operation success update for the targeted services activation and delivery. At step 1020, the NMS receives this network state update and updates the NST. At step 1022, UIM 902 refreshes the network state map to the user. At step 1024, UIM 902 provides a confirmation message to the user. At step 1024, SFM 904 updates local global tables for confirmation of service activation. At step 1026, the process terminates (ends).

Advantageously, the targeted services enablement, as shown in the flow process diagram of FIG. 10, allows a selected input wavelength (carrying the targeted services) to be sent down the network path along with other current services for delivery to users which reduces wasted bandwidth.

A primary function for the SSMs (and associated network elements) is bandwidth management at the optical layer (level of optical wavelengths) without having to decode the content (data payload) carried by the wavelengths. The SSMs switch and route the input wavelengths along a pre-determined path to reach a particular destination. Other functions provided by the SSMs include, but are not limited to, 1) switching wavelengths or aggregates using broadcast, multicast, and cross-connect techniques, 2) automatically select and establish a path for local bandwidth insertion through auxiliary ports of the network elements, 3) automatic wavelength routing and optical switching based on a pre-determined configuration, and 4) maintain a local network state machine to interface and support additional service feature modules (SFM).

The SSM performs automatic wavelength switching on a pre-determined basis to ensure that downstream and upstream traffic are in (perfect) synchronization, and then verification information is sent to the NMS to update the state of the network. The SSM performs wavelength switching on different paths in the form of either broadcast, multicast, or cross-connect.

As illustrated in FIGS. 2–3, network element 200 includes a primary input port (demultiplexer 204) and at least four output ports (output combiners 208). Demultiplexer 204 may identify at least 4 unique input wavelengths or four aggregates of the input wavelength depending upon a pre-determined sensitivity, and the output combiners 208 may receive a varied combination of the input wavelength. "Broadcast" switching refers to an input wavelength being selectively switched to all output combiners (ports) 208. "Multicast" switching refers to an input wavelength being selectively switched to only a particular number of output combiners 208. Additionally, input wavelengths to the input auxiliary ports 222 may be similarly broadcast, multicast, or cross-connected to any outgoing port in addition to the wavelengths input from the demultiplexer 204. Also, a control (supervisory) wavelength may input to demultiplexer 204 and cross-connected to the at least four downstream output combiners 208.

Broadcast and multicast switching allows the network element to produce optical networks that form tree structures with fanout and bandwidth management. Auxiliary ports 212, 214, 222, 224 allow cross-connections and interconnections of parallel trees of the network to form a mesh structure for the optical network.

For upstream communications, there is a parallel stream of upstream traffic that may be switched in the reverse manner (to the downstream traffic) to ensure that return traffic travels back to the original sender along the same (or similar path) of the downstream traffic. Using the SSM, tracking of downstream and upstream traffic occurs to ensure synchronization with each other. The tracking information is fed back to a local and network state machine (at the NMS) for close coordination of downstream/upstream traffic. For an exemplary scenario, in reference to FIG. 5, using a downstream path for an input wavelength including network elements 510, 520, 530, 535, the upstream path would follow a reverse path of network elements 535, 530, 520, 510 to report current state information for the delivery of the input wavelength.

Figure 11:
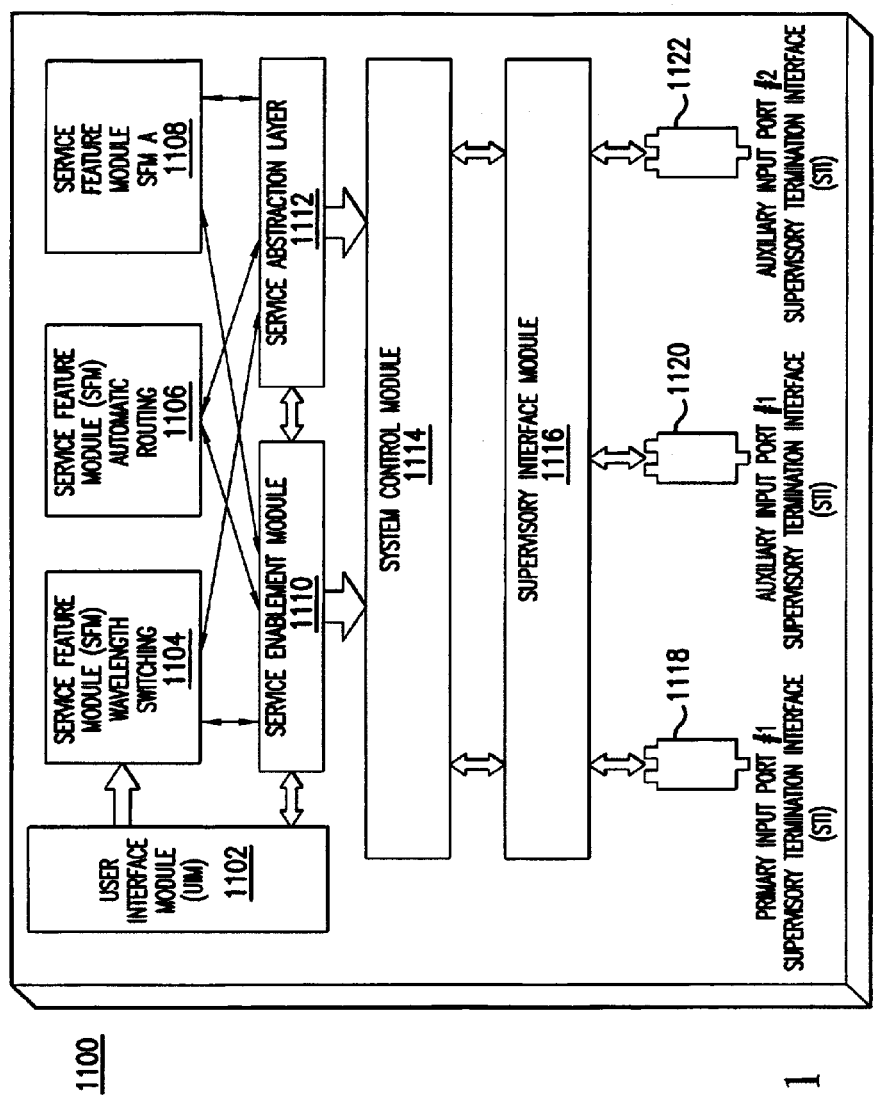
FIG. 11 is a block diagram of an exemplary service enabling system with control channel module attachments in accordance with an embodiment of the present invention.

Performance of wavelength switching by the network elements (and associated SSMs) is under the direction of the control (supervisory) channel. FIG. 11 illustrates a block diagram of the exemplary service enabling system (SES) 1100 with control channel module attachments (used by the NMS 602) in accordance with an embodiment of the present invention. SES 1100 includes a plurality of interconnected, programmable wavelength switching, automatic routing, control channel related modules and components. These components include a user interface module (UIM) 1102, a plurality of service feature modules (SFM) 1104 (wavelength switching module, SFM-WS), 1106 (automatic routing module, SFM-AR), 1108, service enablement module (SEM) 1110, service abstraction layer (SAL) 1112, system control module 1114, supervisory (control) interface module (SIM) 1116 that interconnects to network element components including supervisory (control) termination interfaces 1118, 1120,1122. SFMs 1104,1106,1108, SEM 1110, and SAL 1112 perform similar functions to those described herein with reference to FIG. 9 for activation of wavelength switching and automatic routing features. The control termination interfaces 1118, 1120, 1122 correspond to the primary input port (demultiplexer) and auxiliary input ports to a network element such as input and auxiliary input ports 204, 212, 222 for network element 200.

During operation, input ports 204, 212, 222 accept incoming wavelengths or aggregates of wavelengths for network element 200. The SSM (switch controller 210) for network element 200 identifies each of the individual wavelengths to a user via the UIM 1102, and then accepts commands (e.g., 802, 804, 806 commands) to switch the input wavelengths as required as received over the control (supervisory) channel.

In the optical communications network, every network element (and associated SSM) will receive the control channel (wavelength) in addition to the traffic-bearing channels as the control channel is sent to the primary input ports (demultiplexer) and optionally to the auxiliary input ports. The receiving of the control channel by the SSM enables command execution from the NMS, EMS, and other SSMs (e.g., mesh-connected), for example, NMS 602, EMS 604, 606, and SSMs 622, 624, 626, 628, 630, 632 of FIG. 6.

During transmission, the control channels (wavelengths) are isolated and terminated on the STIs 1118, 1120, 1122 that are controlled by the SIM 1116. The STIs are hardware/software units to terminate the control channel and extract the payload (content) that contains the commands for the SSMs (incoming commands), and to insert a payload and originate an outgoing command to the EMS and NMS. For incoming commands to the NMS from the SSMs, SIM 1116 extracts the payload from a plurality of SSMs, validates the source SSM for each one, and forwards the message on to the SCM 1114.

For outgoing commands to the SSMs, SCM 1114 uses SIM 1116 for addressing and packaging of the commands, and for the selection of appropriate ports to send the outgoing commands, via STIs 1118, 1120, 1122, to the SSMs. SCM 1114 also uses SIM 1116 as asynchronous module to which all control (supervisory) channel and port processing may be transferred (handed off).

During operation, using the SES 1100, downstream wavelengths may be switched from the input port (demultiplexer) of the network element to any of the output ports (combiners) based on the commands sent to the network element (and associated SSM) over the control channel by the NMS. SIM 1116 accepts the commands from the NMS, verifies the target address of the payload, strips the payload headers and trailers, and sends the commands as a message (e.g., 802, 804, 806 message) to SFM 1104 for wavelength switching (WS). SCM 1114 and SEM 1110 perform administrative functions regarding the command transmission by SIM 1116 that include, but are limited to, audit trails, command logging, session validation, and state updates to the NST.

Similarly, for the upstream path using SES 1100, upstream wavelengths may be switched from the output port of the network element to any of the input ports (using a bidirectional optical fiber) based on the original commands sent to the network element (SSM) from the NMS. Advantageously, the upstream path determination and switching setup of a return wavelength is performed at the same time that the downstream path is setup. This simultaneous upstream/downstream setup allows a single command from the NMS to generate two command messages at the SFM-WS 1104, one command to setup the downstream switching path, and a second command to setup the upstream switching path.

Under the direction of the NMS and SFM-WS 1104, the downstream and upstream paths are setup in rapid succession where a status message is sent back from SFM-WS 1104 to the NMS for updating the NSM. The status message records the downstream paths and upstream paths in a downstream path record and upstream path record, respectively, that are sent to the NMS. The NMS uses these records as a successful confirmation of the wavelength switch command that was sent down earlier to the network elements (SSMs) and updates the NSM with the information.

Figure 12:
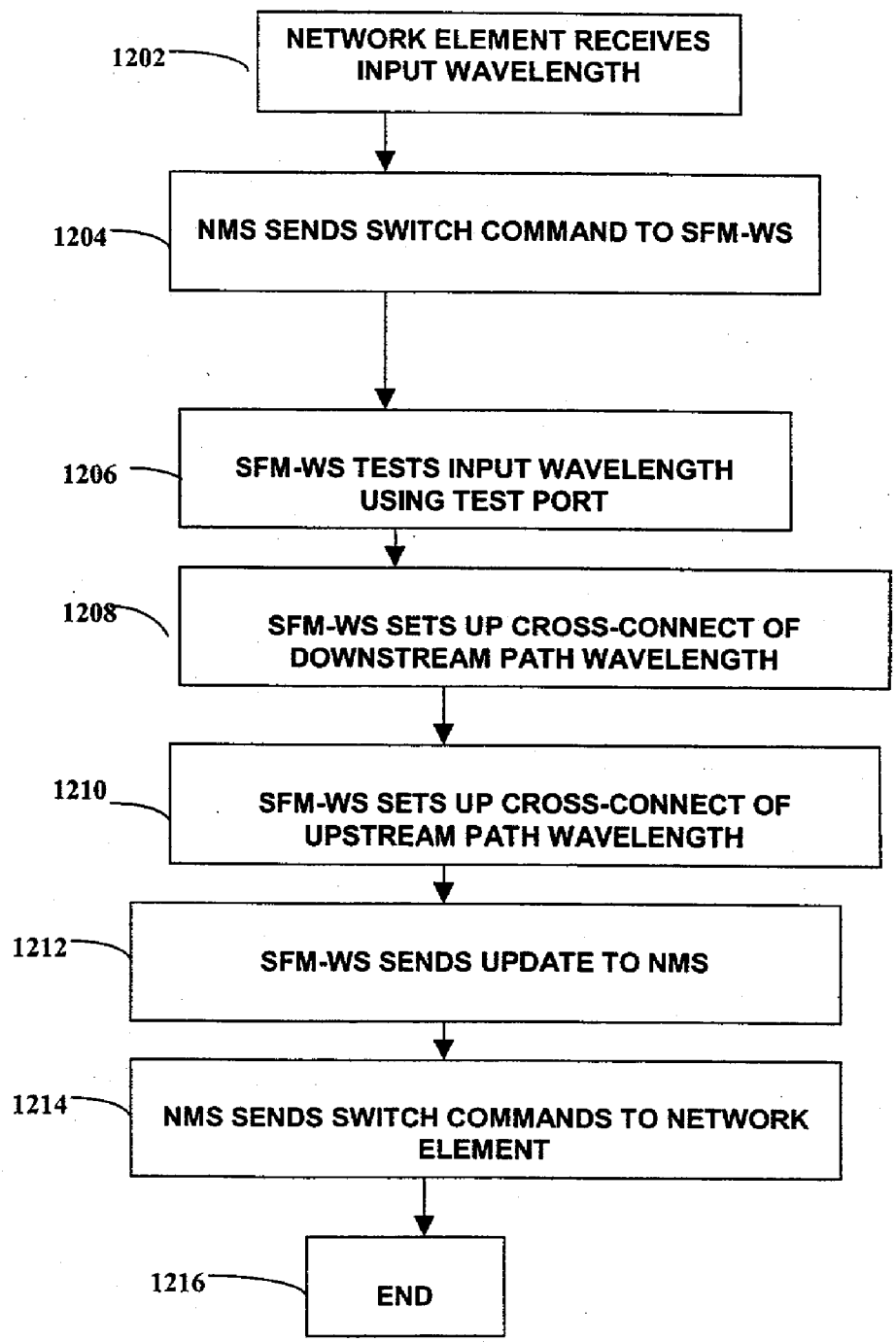
FIG. 12 shows a flow process diagram to perform wavelength switching in accordance with an embodiment of the present invention.

As shown in the flow process diagram of FIG. 12, performance of wavelength switching may include use of a test port. At step 1202, a plurality of incoming, downstream wavelengths, including a control wavelength, are input to a network element via the primary input port (demultiplexer) and/or auxiliary input port (combiner). Additionally, at the same time or a short time period later, a plurality of upstream wavelengths are input to the network element. At step 1204, after receiving identification of the wavelength via UIM 1102, the NMS sends a command to SFM-WS 1104 to switch the particular wavelengths from the input port to selected output ports.

At step 1206, SFM-WS 1110 may optionally test the incoming wavelengths by sending a command to the network element to cross-connect briefly at least one input wavelength to the test port (such as test port 225 for network element 200). The testing of the input wavelength may include generation of traffic information on the input port. SFM-WS 110 then sends a confirmation message to the NMS before actual switching is initiated.

At step 1208, SFM-WS 110 (under the direction of the NMS) sets up a downstream path to cross-connect the input downstream wavelength(s) to at least one pre-determined output port. Simultaneously or within a short time period, at step 1210, SFM-WS 110 sets up an upstream path to cross-connect the upstream wavelength(s) from an input port (demultiplexer, splitter) to at least one pre-determined output port (combiner). Thereafter, at step 1212, SFM-WS 1104 sends an update (downstream and upstream path records) to the NMS for updating the NSM. Finally, at step 1214, the NMS sends a command to the network element, over the control channel, with actual port/destination information for the downstream and upstream wavelengths to activate actual switching of the downstream and upstream wavelengths. At step 1216, the process terminates. Alternatively, where the incoming wavelengths (downstream, upstream) are input from the auxiliary input ports and originated by other network elements, (local) command direction may be performed by the originating network element to initiate wavelength switching for the incoming wavelengths to the succeeding network element.

Advantageously, the functions of wavelength switching and insertion of additional wavelengths may be used to provide customized services to users. In an exemplary scenario, in reference to FIGS. 4 and 11, input wavelengths λ1, λ2, λ5, λ6, may be scheduled, using UIM 1102, to be delivered to business users during a daily time period (e.g., 8 am–6 pm). At 6 pm, a portion of these wavelengths (e.g., λ1, λ2, λ5) may be scheduled to be switched over to alternate output ports to reach targeted residential users for a regular evening time period (e.g., 6 pm–8 am). Also, at 6 pm, an additional wavelength insertion may be scheduled to insert an additional wavelength, switched to the evening output ports, (e.g., λ6') into the communications services targeted for the select group of residential users. Advantageously, λ6' may operate on the same wavelength as λ6 (e.g., both at 1333 nm) to provide bandwidth efficiency (sharing), but carries particular content targeted to the selected residential users. Using the embodiments described herein, any number of triggers may be used to deliver targeted communications to shared users (e.g., business, residential).

Figure 13:
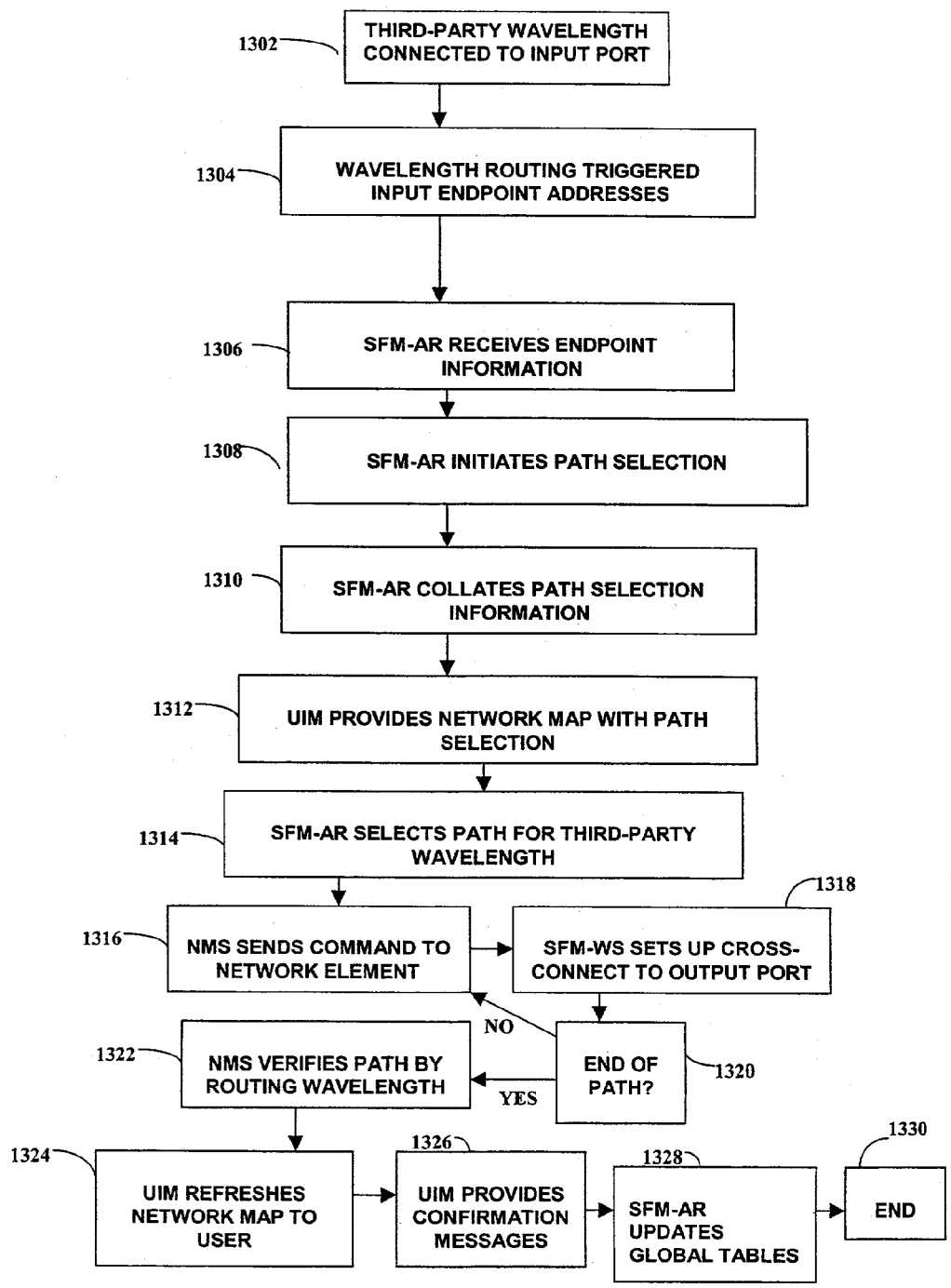
FIG. 13 shows a flow process diagram to activate automatic routing in accordance with an embodiment of the present invention.

Advantageously, in a mesh design of network elements in an optical communications network, automatic wavelength routing may be performed as illustrated in the flow process diagram of FIG. 13. The process provides for a particular routing path when (locally) inserting a third-party (non-native) wavelength at one point in the network and then routing the third-party wavelength to another point in the network, such as for the exemplary network configuration illustrated in FIG. 5.

At step 1302, the third-party wavelength (e.g., from a wireless base station) is physically interconnected (provided access) to the input port (auxiliary port) for a network element. At step 1304, the automatic wavelength routing feature is triggered by specifying the endpoints for the third-party wavelength routing path. The automatic wavelength routing feature may be triggered using a plurality of methods including, but not limited to, field operator input and NMS operator input. A field operator may use a craft terminal, inter connected to the network element (including switch controller) via craft interface 728, to input a predefined (basic) command that includes the local insertion address for the input port of the source network element (interconnected to the third-party wavelength source) and the destination address (of the output port) for the remote network element to which the third-party wavelength is routed, for physical interconnection to an external device (e.g., to a MTSO). Alternatively, the two endpoints (source input port address, destination output port address) for the third-party wavelength may be selected by a NMS operator using the user interface module (UIM) 1102.

At step 1306, SFM-AR 1106 receives the addresses for the two endpoints via a command from the field or NMS operator. At step 1308, SFM-AR 1106 initiates path selection for the third-party wavelength using network state information maintained by the NSM. SFM-AR 1106 may use a plurality of programmable algorithms to explore each tree and branch structure of the network element mesh configuration while avoiding routing loops and redundant paths. At step 1310, SFM-AR 1106 collates the potential path selection information, and at step 1312, UIM 1102 provides a network map with the path selection alternatives for the third-party wavelength. At step 1314, SFM-AR 1106 selects an optimal path from one of the algorithm results as shown on the network map.

Thereafter, at step 1316, the control system enters a wavelength switching mode where the NMS sends a command to the current source network element, over the control channel, with actual output port/destination information for the third-party wavelength to setup switching of the input third-party wavelength from the auxiliary input port to a selected output port. At step 1318, the SSM (at the associated current source network element) sets up switching (cross-connection) of the third-party wavelength to the predetermined output port.

At step 1320, a decision analysis is performed to determine whether the endpoint (actual output port address for remote network element) has been reached for the third-party wavelength. If no, then the NMS selects the next (succeeding) network element for configuration (setup), and steps 1316, 1318 are repeated for each succeeding network element until network path completion has been reached for setting up the third-party wavelength routing.

If yes, at step 1322 the NMS verifies path completion by routing the third-party wavelength along the selected network path. Once verified, at step 1324 the UIM 1102 updates the network state map (NST) to the user or to the field operator if a craft terminal routing was used. At step 1326, UIM 1102 provides a confirmation message to the user of path completion and third-party wavelength routing. At step 1328, SFM-AR 1106 updates local global tables for confirmation of service (automatic wavelength routing) activation. At step 1330, the process terminates.

Other functions provided by control system 600 include, but are not limited to, 1) providing accounting information and statistics to be fed into billing systems for accurate billing of services provided (activated) for users via the network elements (SSMs), and 2) identifying and recording detailed session information for session-based billing.

Using NMS 602, a billing system for the optical communications network may be developed using a plurality of methods including, but not limited to, 1) direct billing on a fixed time basis, 2) billing based on traffic usage on the ports of the network elements, 3) billing based on quantity of wavelengths switched upstream, downstream, and cross-connected in the network. A particular billing method may be selected, and the SSM (for each network element) will generate periodically summarized accounting and billing information.

In accordance with embodiments of the present invention, traffic-based billing may be used by the control system 600. As described herein, the SSM modules collect information regarding communication traffic upon cross-connecting occurring where cross-connection may be generated by control channel direction from the NMS, automatic wavelength routing, late insertion of additional wavelengths, or other methods. For control channel direction of cross-connection, the source node, intermediate points, and destination node of the complete routing path are known (defined) by the control system which makes billing parameters such as connection links, number of hops traversed, and other billing parameter easily provided to the billing system for the network.

For other cross-connection methods such as automatic routing and late insertion of additional wavelengths, the routing path follows a point-to-point cross-connect scheme where these billing parameters may be derived by the control system. For multi-hop broadcast or multicast routing paths, the billing parameters may be derived by taking each traversed link as a single segment and appending them into a mesh of connections.

Session-based billing (dynamic billing), using session identification, may be a further alternative form of billing. A session may be defined as the time (from start to end) for switching a wavelength from one end of the network to another. The end-to-end accounting information may be gathered from the NSM and used to represent a "session". A session, as defined, may include all the current and past states of network elements available from the NMS in the form of network state snapshots. Session representation may be used advantageously for billing non-native traffic routing across the network as the time, ports used, and wavelengths switched, cross-connected, and routed along the non-native wavelength path may be recorded and read from the NSM to determine the "session". Advantageously, a single parameter or a combination of these parameters may be used to arrive at a unique billing characteristic that is synonymous with the type of traffic, billing systems or the type of service that is delivered using the network.

For example, targeted services feature enablement provides a specific value-added revenue generating service that is targeted to a particular group of users. Specific session utilization information may be collected along the path (e.g., number of hops, ports, session time, etc.) of the particular service route chosen for this targeted service enablement. For a targeted services session that uses a single point-to-point cross-connect, the session information that is generated for each leg or segment may be collated in a linear fashion. For a targeted services session that is directed to a group of users, the session may be multicast and the information collation may be more difficult and complex. For all sessions, inputs from the NSM may be used to generated an appropriate method of aggregating the collated information.

Furthermore, accounting information may be generated in the network elements and sent periodically sent to the NMS system for collation and archival. This accounting data may be stored on the network element itself using, for example, a non-volatile medium so that key information is not lost during a power outage. Also, advantageously, the internal clocks for all network elements may be synchronized (using the input traffic stream header and payload data) with each other to ensure accurate billing and accounting.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. An apparatus for providing dynamic bandwidth control to a broadcast optical communications network, comprising:
a network element to communicate downstream to users, comprising:
a demultiplexer to separate a received optical communications signal, carrying a mixture of broadcast and targeted communications services for users, into a plurality of wavelengths;
a plurality of splitters, each splitter to receive one of said plurality of wavelengths as an input signal, and to split said input signal into a plurality of output signals;
at least one optical cross-connect switch to receive said plurality of output signals from said splitters, and to connect each output signal respectively to a pre-determined output port; and
a plurality of combiners, each combiner having at least one more input signal than the number of output signals for each said splitter wherein the at least one more input signal carries at least one control channel, operating on a control wavelength, to control selection of the pre-determined output ports by which the switch, and each combiner to receive, combine, and output a plurality of said output signals from said switch.

2. The apparatus of claim 1, further comprising:
at least one amplifier to amplify said received optical communications signal and output the amplified signal to said demultiplexer.

3. The apparatus of claim 1, further comprising:
at least one auxiliary input port to input at least one additional optical communications signal into said switch; and
at least one auxiliary output port to output said additional signal from said switch.

4. The apparatus of claim 3, wherein said additional optical communications signal is input from an alternate communications network.

5. The apparatus of claim 4, wherein said alternate communications network is a wireless communications network.

6. The apparatus of claim 5, wherein said additional signal to communicate between a base station and a mobile telephone switching office in the wireless communications network via connection to a plurality of other auxiliary input and output ports on a plurality of other optical switches.

7. The apparatus of claim 3, wherein said additional optical communications signal is an additional wavelength signal input into said switch as determined by said control channel.

8. The apparatus of claim 7, further comprising:
an optical transponder to convert an existing wavelength, one of said plurality of wavelengths output by said demultiplexer, into said additional wavelength.

9. The apparatus of claim 1, further comprising:
a switch controller to monitor said switch including the ports, and to receive and process information carried by said control channel, said control channel being carried by said received optical communications signal, and to output said control channel into said optical switch; and
wherein the input of said control channel into said switch to initiate switching, for a pre-determined interval, of the splitter output signals to said pre-determined output ports as selected by the control wavelength.

10. The apparatus of claim 1, further comprising:
a network element to communicate upstream within an optical communications network, comprising:
a plurality of demultiplexers, each demultiplexer to separate a plurality of received optical communications signals into a plurality of output wavelengths;
at least one optical cross-connect switch to receive said plurality of output wavelengths from said plurality of demultiplexers, and to connect each output wavelength to a pre-determined output port; and
at least one combiner having at least one more input signal than the total number of output wavelengths for each said demultiplexer wherein the at least one more input signal carries at least one control channel, operating on a control wavelength, to control selection of the pre-determined output ports by the switch, and the at least one combiner to receive and combine a plurality of said output wavelengths from said switch, and to output said combined signal carrying said output wavelengths.

11. The apparatus of claim 10, further comprising:
a switch controller, interconnected to the upstream network element, to monitor said switch including the ports, and to receive and process information carried by said at least one control channel, said at least one control channel being carried by each received optical communications signal, and to output said at least one control channel into said optical switch; and wherein the input of said at least one control channel into said switch to initiate switching, for a pre-determined interval, of the plurality of demultiplexers output wavelengths to said pre-determined output ports as selected by the control channel.

12. The apparatus of claim 1, wherein said plurality of wavelengths carry a mixture of broadcast and targeted communications services for business and residential users, and said plurality of wavelengths are shared by said residential and business users, as controlled by the control channel, for independent, pre-determined intervals.

13. The apparatus of claim 12, wherein said communications services targeted for the business users includes Ethernet and Internet communications services.

14. An apparatus for providing dynamic bandwidth control to a broadcast optical communications network, comprising:
- a network element for communicating downstream to users:
- a demultiplexer to separate a received optical communications signal into a plurality of wavelengths;
- a plurality of splitters, each splitter to receive one of said plurality of wavelengths as an input signal, and to split said input signal into a plurality of output signals;
- at least one optical cross-connect switch to receive said plurality of output signals from said splitters, and to connect each output signal respectively to a pre-determined output port;
- a plurality of combiners, each combiner having at least one more input signal than the number of output signals for each said splitter wherein the at least one more input signal carries at least one control channel, operating on a control wavelength, and each combiner to receive and combine a plurality of said output signals from said switch, and to output said combined signals; and
- a switch controller to monitor said switch including the ports, and to receive and process information carried by said control channel, said control channel being carried by said received optical communications signal, and to output said control channel into each said combiner.

15. A control system to provide dynamic bandwidth control to a broadcast optical communications network, comprising:
- a system software module to control and monitor a network element, the network element comprising:
- a demultiplexer to separate a received optical communications signal, carrying a mixture of broadcast and targeted communications services for users, into a plurality of wavelengths;
- a plurality of splitters, each splitter to receive one of said plurality of wavelengths as an input signal, and to split said input signal into a plurality of output signals;
- at least one optical cross-connect switch to receive said plurality of output signals from said splitters, and to connect each output signal respectively to a pre-determined output port; and
- a plurality of combiners, each combiner having at least one more input signal than the number of output signals for each said splitter wherein the at least one more input signal carries at least one control channel, operating on a control wavelength, to control selection of the pre-determined output ports by the switch, and each combiner to receive, combine, and output a plurality of said output signals from said switch.

16. The control system of claim 15, wherein said system software module includes a processor to perform one of receiving at least one command over said control channel and executing said at least one command, and generating a message to send over said control channel.

17. The control system of claim 16, wherein said processor to execute said at least one command by enabling or disabling a portion of the network element based on said at least one command and providing a feedback response on the execution of said at least one command, the response including the condition of the network element portion.

18. The control system of claim 16, wherein said processor to execute one of at least one direct, broadcast, and chained command; and
- wherein a direct command being received based on an internet protocol address for the network element, a broadcast command being received as a command sent to a plurality of network elements, and a chained command being received as a command sent to successive network elements, one after the other, as the received chained command is executed at each current network element.

19. The control system of claim 16, wherein said processor to generate a message at pre-determined intervals, the message carrying information about the current condition of the network element.

20. The control system of claim 15, further comprising:
- an element management system programmable to interface with at least one system software module over the control channel including providing a graphical user interface to receive user request and to translate the user requests into at least one command to send the system software module, and to receive a response from the system software module verifying the completion of the at least one command sent to the module.

21. The control system of claim 20, wherein said element management system being programmable to monitor communications traffic on the network element ports using traffic data requested from and sent by said system software module, and to generate alarms or reconfigure the network element to change traffic loads on the ports based on said traffic data.

22. The control system of claim 20, wherein said element management system being programmable to generate pre-determined statistical information about communications traffic input and output on pre-determined ports of the network element.

23. The control system of claim 15, further comprising:
- a network management system programmable to interface with at least one element management system over the control channel; and
- wherein the network management system including a services enabling module to provide targeted communications services to users, and including a network state machine that includes a network state table to provide information about the current state of the optical communications network.

24. The control system of claim 23, wherein said services enabling module including a user interface module to provide and display a network map showing the positions of a plurality of network elements in the communications network, and to allow a user to select a target area of at least one network element for targeted communications services where at least one selected wavelength to be sent to the target area.

25. The control system of claim 24, wherein said services enabling module programmable to send commands, using said system software module, to the at least one network element to connect the selected wavelength as an input wavelength to a selected at least one output port of the targeted network element.

26. The control system of claim 25, wherein said commands include a command to connect a returning wavelength from the at least one output port to an input port of the targeted network element to allow upstream communications services, and wherein said network state table is updated upon the network management system receiving confirmation of the command execution.

27. The control system of claim 23, wherein said network state machine being programmable to locate all network elements in the optical communications network and to generate a network state map including all network elements based on receiving messages, in response to queries from the network management system, from at least one system software module over the control channel.

28. The control system of claim 23, wherein said network state machine being further programmable to update the network state map based on updated messages being received from the at least one system software module.

29. The control system of claim 23, wherein said services enabling module programmable to send at least one command, using said system software module, to the at least one network element to connect an additional wavelength as an input wavelength to a selected at least one output port of the targeted network element, and to setup a routing path for said additional wavelength through a plurality of additional network elements to a selected endpoint, as selected by said network management system.

30. The control system of claim 29, wherein said network state table is updated, to indicate that said routing path has been established, upon the network management system receiving confirmation of the command execution.

31. A method to provide dynamic bandwidth control to a broadcast optical communications network, comprising:

receiving and separating an optical communications signal into a plurality of wavelength signals;

splitting each wavelength signal into a plurality of splitted input signals;

connecting each input signal respectively to a pre-determined output port to generate an output signal; and combining pre-determined groups of output signals together to generate a plurality of grouped output signals, where the output signals each include at least one more output signal than splitted input signal wherein the at least one more output signal carries at least one control channel, operating on a control wavelength, to control connecting of the splitted input signals to the output ports.

32. The method of claim 1, wherein said optical communications signal only carries audio signals.

33. The method of claim 1, wherein said optical communications signal only carries video signals.

* * * * *